(12) United States Patent
Ojard et al.

(10) Patent No.: US 7,068,728 B2
(45) Date of Patent: Jun. 27, 2006

(54) CARRIERLESS BACKWARDS COMPATIBLE DATA NEWORKING TRANSMITTER, RECEIVER, AND SIGNAL FORMAT

(75) Inventors: Eric Ojard, San Francisco, CA (US); Jason Trachewsky, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 875 days.

(21) Appl. No.: 10/077,652

(22) Filed: Feb. 15, 2002

(65) Prior Publication Data

US 2003/0156656 A1 Aug. 21, 2003

Related U.S. Application Data

(63) Continuation-in-part of application No. 09/971,407, filed on Oct. 5, 2001, now Pat. No. 6,907,086, which is a continuation of application No. 09/169,552, filed on Oct. 9, 1998, now Pat. No. 6,327,311, application No. 10/077,652, which is a continuation-in-part of application No. 09/585,774, filed on Jun. 2, 2000, now Pat. No. 6,625,459.

(51) Int. Cl.
*H04L 27/04* (2006.01)
*H04L 27/20* (2006.01)
(52) U.S. Cl. .................. 375/295; 375/259; 375/219; 370/317; 370/320
(58) Field of Classification Search ............... 375/219, 375/220, 221, 295, 259; 370/317, 320
See application file for complete search history.

(56) References Cited

U.S. PATENT DOCUMENTS

| | | | | |
|---|---|---|---|---|
| 5,745,839 A | * | 4/1998 | Lieberman | 455/10 |
| 5,987,068 A | * | 11/1999 | Cassia et al. | 375/281 |
| 6,061,555 A | * | 5/2000 | Bultman et al. | 455/313 |
| 6,154,659 A | * | 11/2000 | Jalali et al. | 455/522 |
| 6,195,563 B1 | * | 2/2001 | Samuels | 455/84 |
| 6,639,939 B1 | * | 10/2003 | Naden et al. | 375/140 |
| 2002/0181390 A1 | * | 12/2002 | Mody et al. | 370/208 |
| 2003/0139151 A1 | * | 7/2003 | Lifshitz et al. | 455/91 |

* cited by examiner

*Primary Examiner*—Jean B. Corrielus
*Assistant Examiner*—Qutub Ghulamali
(74) *Attorney, Agent, or Firm*—Garlick, Harrison & Markison LLP; Bruce Garlick

(57) ABSTRACT

New version packet data devices support a backwards-compatible signal format. New version devices operate within a first frequency band while old version devices operate within a second frequency band. The first frequency band differs from but overlaps with the second frequency band. The new version devices may operate on a first carrier frequency (within the first frequency band) while old version devices may operate at a second carrier frequency (within the second frequency band). The new version devices and/or the old version devices may also support carrier-less modulations. Preamble, header, and trailer portions of a new version signal include a plurality of spectral copies of a baseband modulated signal. One or more of these spectral copies of the baseband modulated signal is/are indistinguishable from corresponding components of an old version signal. The payload of the new version signal may be formed in the same manner or may be formed in have a wider bandwidth, higher data rate format.

42 Claims, 15 Drawing Sheets

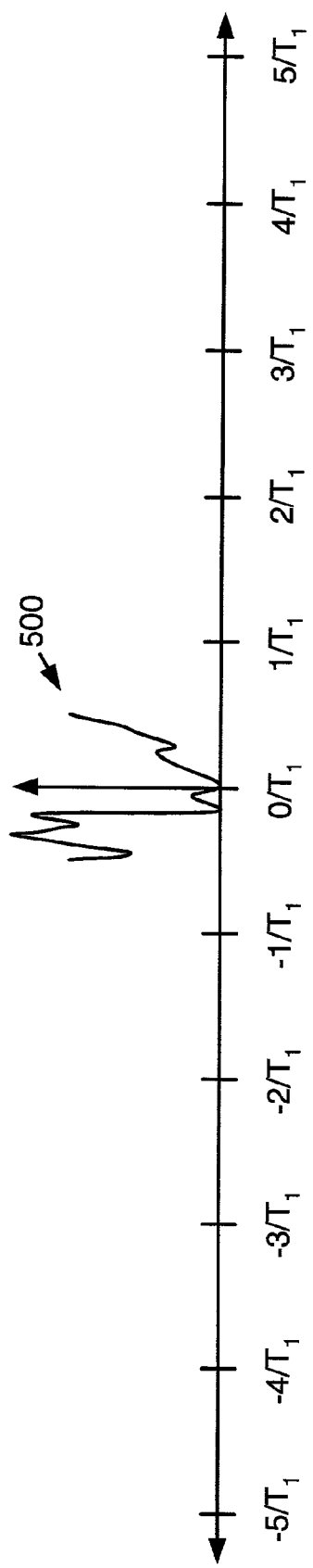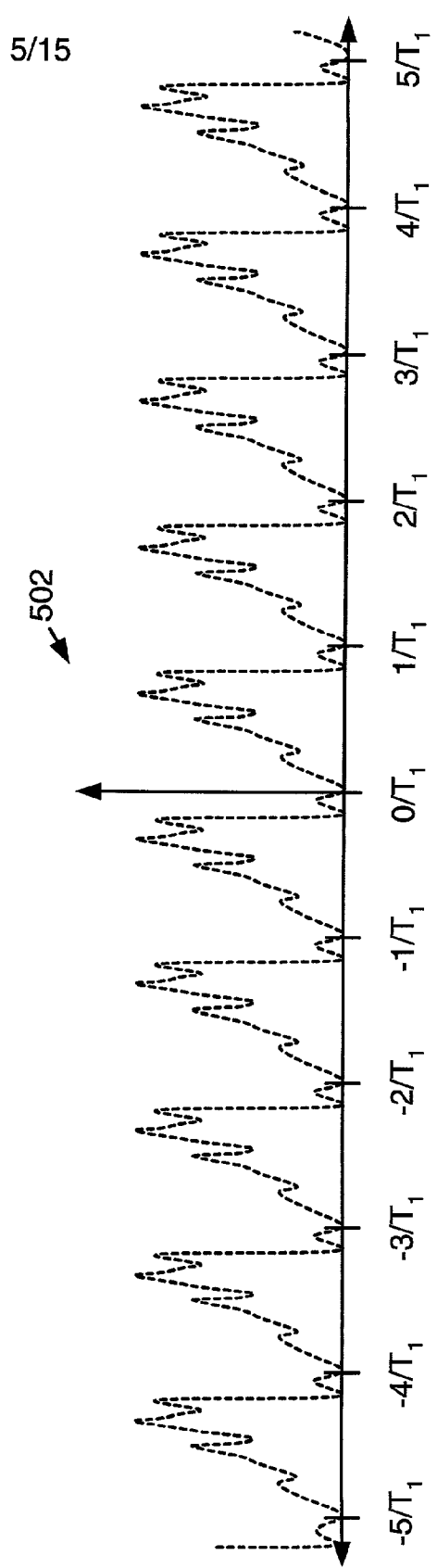
FIG. 5A
FIG. 5B

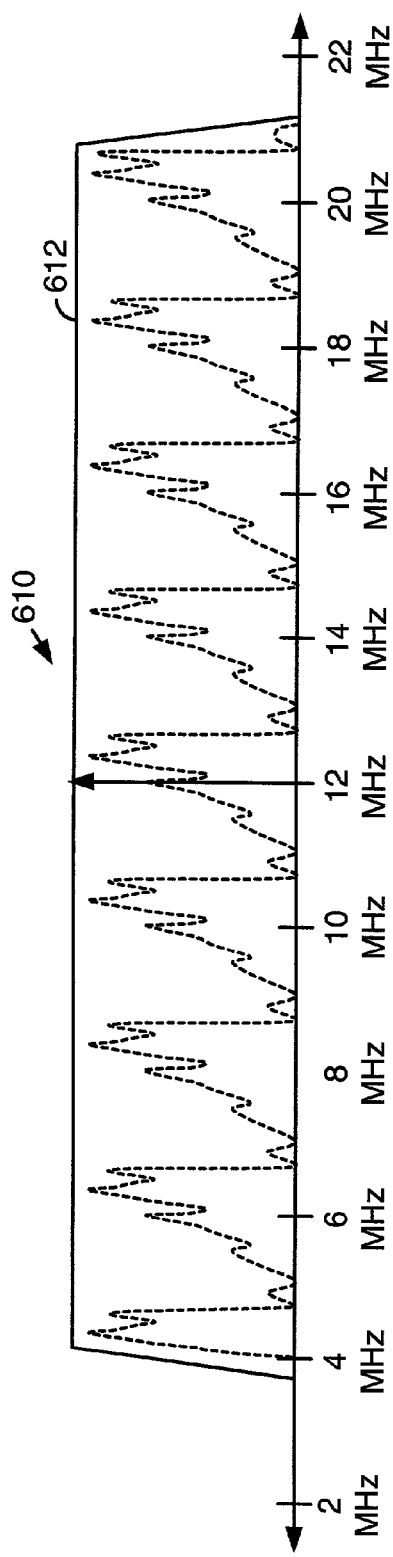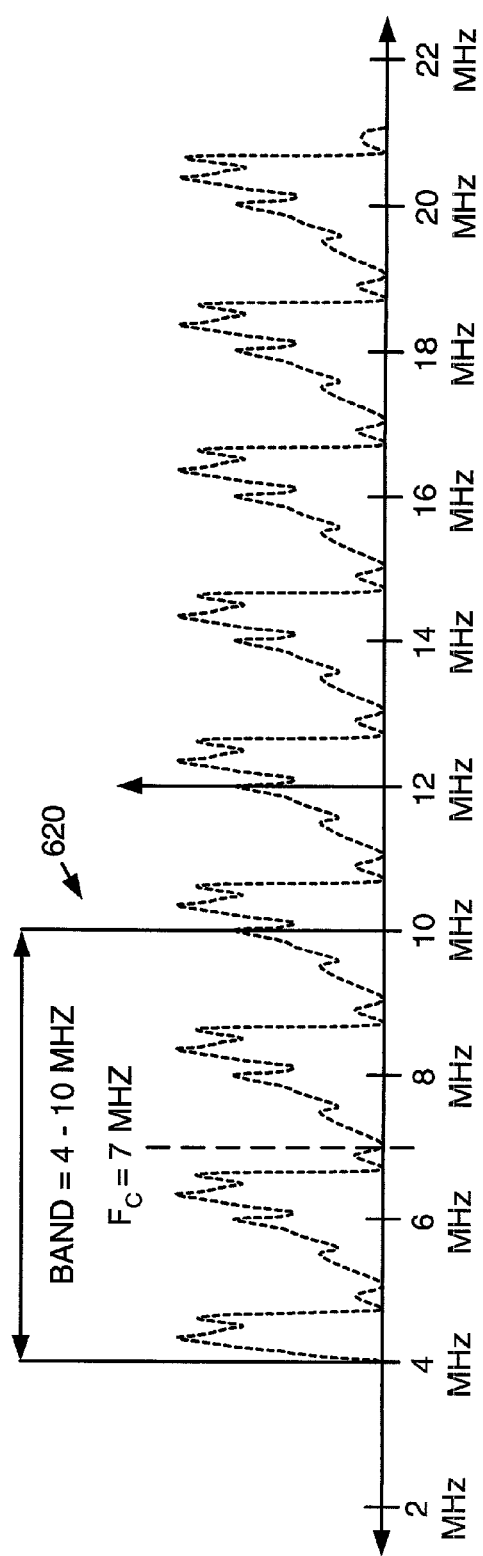

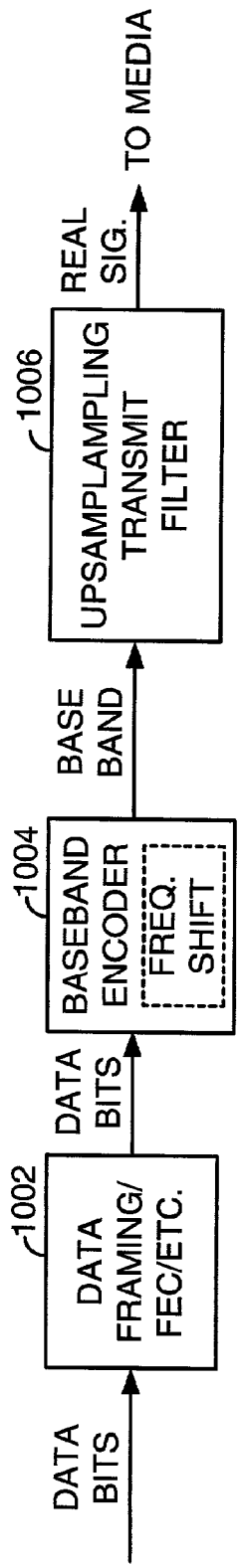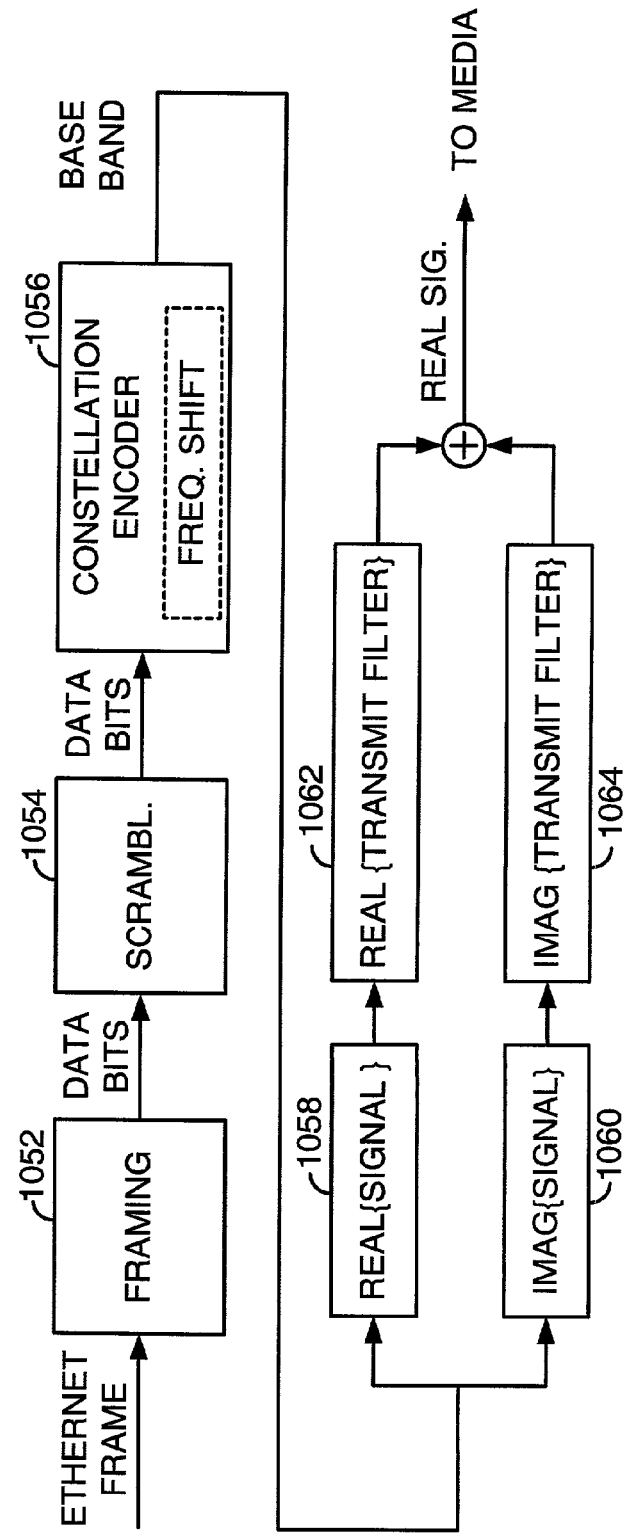
FIG. 10A
FIG. 10B

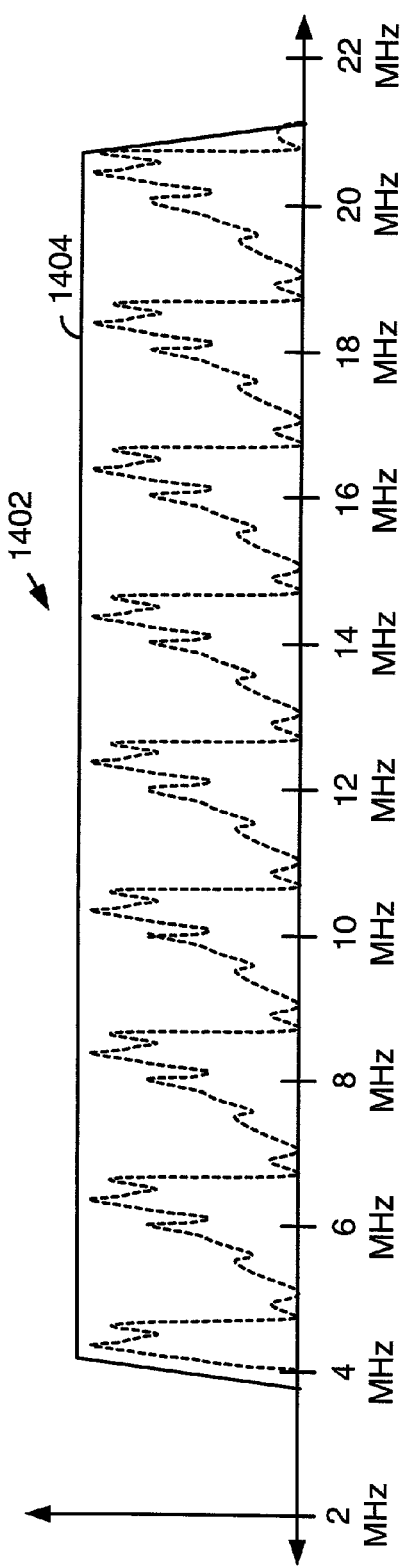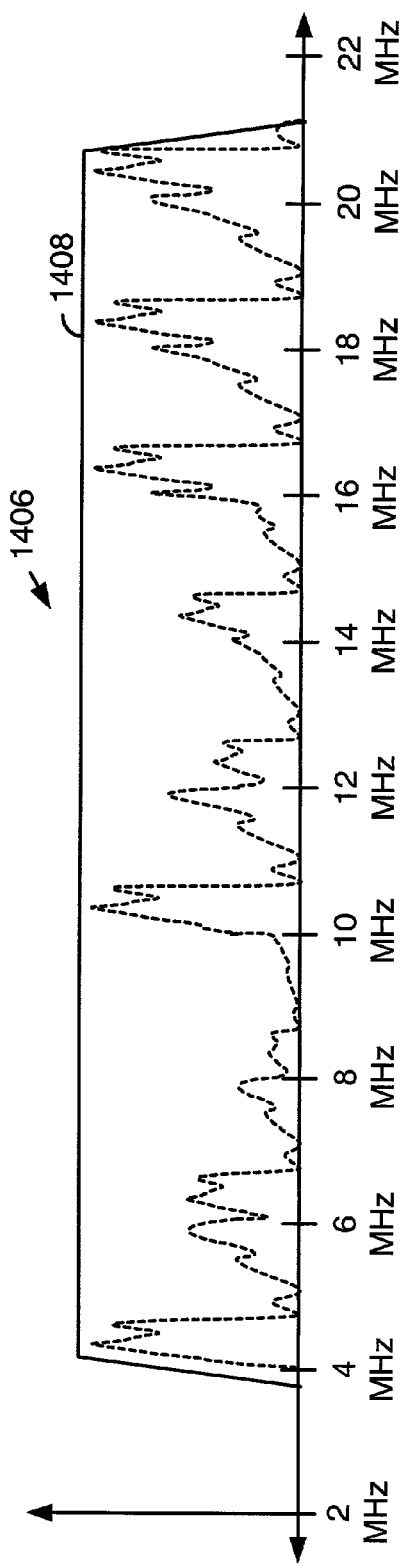
FIG. 14A
FIG. 14B

CARRIERLESS BACKWARDS COMPATIBLE DATA NEWORKING TRANSMITTER, RECEIVER, AND SIGNAL FORMAT

CROSS REFERENCES TO PRIORITY APPLICATIONS

This application is a continuation-in-part of U.S. Regular application Ser. No. 09/971,407, filed Oct. 5, 2001, now issued as U.S. Pat. No. 6,907,086, which is a continuation of U.S. Regular application Ser. No. 09/169,552 filed Oct. 9, 1998, now issued as U.S. Pat. No. 6,327,211 both of which are incorporated herein by reference in their entirety. This application is also a continuation-in-part of U.S. Regular application Ser. No. 09/585,774, filed Jun. 2, 2000, now issued as U.S. Pat. No. 6,625,459, which is also incorporated herein by reference in its entirety.

FIELD OF THE INVENTION

This invention relates generally to wired communications; and more particularly to wired packet data network communications.

BACKGROUND OF THE INVENTION

Packet data networks, their structure, and their operation are generally known. Examples of packet data networks include Local Area Networks (LANs), Wide Area Networks (WANs), and the Internet, among others. Packet data networks may be wired, wireless, or a combination of wired and wireless networks. Particular examples of networks include wired Ethernet LANs (IEEE 802.3 networks), wireless LANs (IEEE 802.11 networks), and Home Networks (HomePNA networks), among others. Each of these networks services data communications between groups of intercoupled network clients. As network client data exchange demands have increased, operating capabilities of these networks have also increased. For example, wired Ethernet LANs first serviced data communications at relatively low data throughput rates, e.g., 10 MBPS but now service data communications at relatively higher data rates, e.g., 100 MBPS, 1 GBPS, and higher. HomePNA networks have also evolved to support greater data rates with each HomePNA Specification revision.

The HomePNA Specification sets forth operations that, when implemented, allow a plurality of network devices to communicate with one another via premises telephone wiring, e.g., unshielded twisted pair (UTP) wiring. A currently existing version of the HomePNA Specification is known as the HomePNA 2.0 Specification. The HomePNA 2.0 Specification specifies a frequency band of 4–10 MHz, a carrier frequency of 7 MHz, preamble/header/trailer symbol rates of 2 MBaud, payload symbol rates of 2 and 4 MBaud, and constellations of between 2 and 8 bits/symbol. In a typical HomePNA network installation, a plurality of network devices, e.g., computers, share the premises telephone wiring with telephones and other devices that access the telephone network via the telephone wiring.

With HomePNA networks as well as other networks, each network device is usually compliant with one particular version of a corresponding operating standard, e.g., the HomePNA 2.0 Specification. In most installations, it is desirable for devices that support differing versions of the operating standard to share a common physical media. For example, in a HomePNA network, it is desirable for some network devices that support an old version of the HomePNA Specification to share the UTP wiring with other network devices that support a new version of the HomePNA Specification. However, inherent incompatibility typically exists between network devices supporting old versions of the standard as compared to network devices supporting new versions of the standard. With some operating standards, such as the HomePNA Specification, newer versions require operation in a wider frequency band. Thus, when a corresponding network is upgraded, all network devices are typically modified so that they all support the new version of the standard. In this fashion, all network devices will support the higher data rates of the new version. Unfortunately, upgrading from an old version of the standard to a new version of the standard requires the purchase of additional hardware and/or software that may be significantly expensive.

Thus, there is a need in the art for devices that support a new version of an operating standard but that are backwards compatible with devices that support old versions of the operating standard. With this backwards compatibility operation, the higher rates of the new version of the standard must also be supported between new version devices. Further, these devices must embody a methodology that simplifies bandwidth compatibility between old version devices and new version devices.

SUMMARY OF THE INVENTION

In order to overcome the previously described shortcomings of packet data networks as well as additional shortcomings of the prior devices, new version devices operating according to the present invention include a transmitter structure that produces a backwards-compatible new version signal that may be received by old version devices. New version devices also include a receiver structure that receives both new version signals and old version signals. According to the present invention, new version devices operate within a first frequency band while old version devices operate within a second frequency band. The first frequency band is wider than the second frequency band, but overlaps with the second frequency band. New version devices may operate on a first carrier frequency (within the first frequency band) while old version devices may operate at a second carrier frequency (within the second frequency band). However, operation according to the present invention supports carrier-less modulations as well.

To address the inherent incompatibility between new version devices and old version devices, a new version signal includes a spectral component that appears, from the perspective of an old version device, to be an old version signal. Using this spectral component of the new version signal, a new version device transmits control information and data to the old version device. According to one structure of the new version signal, the new version signal includes a plurality of spectral copies of a baseband modulated signal that reside within the first frequency band. One (or multiple) of these spectral copies of the baseband modulated signal also resides within the second frequency band and is/are indistinguishable from the old version signal. Throughout this application, two signals that differ only in frequency-dependent magnitude and phase are considered indistinguishable, since these differences could be attributed to the communications channel, which can introduce arbitrarily large amounts of frequency-dependent attenuation.

Likewise, the old version signal, when operated upon by a new version device, is indistinguishable from the new version signal (at corresponding symbol rates). Specifically, the old version signal appears to be a new version signal with part of the frequency band highly attenuated by the channel. Since receivers must be capable of receiving signals over such channels, they can receive old version signals in the same manner, without prior knowledge of the signal type. Thus, the new version signal also supports the transmission of control information and payload from old version devices to new version devices. According to one structure of the old version signal and the new version signal of the present invention, the old version signal includes a spectral copy of a baseband modulated signal that resides within the second frequency band. This spectral copy of the baseband modulated signal also resides within the first frequency band and, when operated upon by the new version device, may be processed as if it were a new version signal.

In one embodiment of the new version signal, all preamble, header, and trailer portions of a new version signal include a component (one of a plurality of spectral copies of a baseband modulated signal) that is indistinguishable from an old version signal. However, the new version signal is formed to include this component for payload transfer as well when a new version device transmits data to an old version device. When a new version device transmits data to another new version device, the payload portion of the new version signal may be incompatible with the old version device. Based upon the contents of the header, however, an old version device determines that the payload is not for it intended and ignores the payload.

The new version signal of the present invention may include a frequency-shifted portion and a non frequency-shifted portion. In such case, the frequency-shifted portion includes a plurality of spectral copies of a baseband modulated signal that are transmitted within the first frequency band. One (or more) of these spectral copies of the baseband modulated signal is indistinguishable from an old version signal. Frequency shifting is performed so that at least one spectral copy of the baseband modulated signal is correctly formed within the second frequency band such that it is indistinguishable from an old version signal. In this embodiment, absent the frequency shifting operations, the new version signal would be incompatible with old version devices. With this embodiment, non-payload portions of the new version signal, i.e., preamble, header and trailer, are shifted in frequency for all operations. However, payload portions of the new version signal are frequency shifted only when intended for old version devices (or when transmitting at a symbol rate consistent with old version devices).

The signal format of the present invention provides the significant benefits of being fully backwards compatible between old version devices and new version devices and of supporting high data rate operations between new version devices. Other features and advantages of the present invention will become apparent from the following detailed description of the invention made with reference to the accompanying drawings.

BRIEF DESCRIPTION OF THE DRAWINGS

These and other features, aspects and advantages of the present invention will be more fully understood when considered with respect to the following detailed description, appended claims and accompanying drawings wherein:

FIG. 5A is a graph illustrating the power spectral density of a baseband modulated signal carrying a preamble and header that is formed according to the present invention;

FIG. 5B is a graph illustrating the power spectral density of a plurality of spectral copies of the signal of FIG. 5A;

FIG. 6B is a graph illustrating the power spectral density of the signal of FIG. 6A after modulation with a new version device carrier of 12 MHz and transmit filtering according to the present invention;

FIG. 6C is a graph illustrating the power spectral density of the signal of FIG. 6B that is also overlaid with a 7 MHz carrier and 4–10 MHz frequency band of an old version device;

FIG. 10A is a block diagram generally illustrating the components of a carrier-less transmitter that operates according to the present invention;

FIG. 10B is a block diagram illustrating in more detail the components of a carrier-less transmitter operating according to the present invention with particular applicability to a home networking installation;

FIG. 14A is a graph illustrating the power spectral density of a new version signal after transmit filtering;

FIG. 14B is a graph illustrating the power spectral density of the new version signal of FIG. 14A after channel attenuation and receive filtering by a new version device.

DETAILED DESCRIPTION OF THE INVENTION

Figure 1:
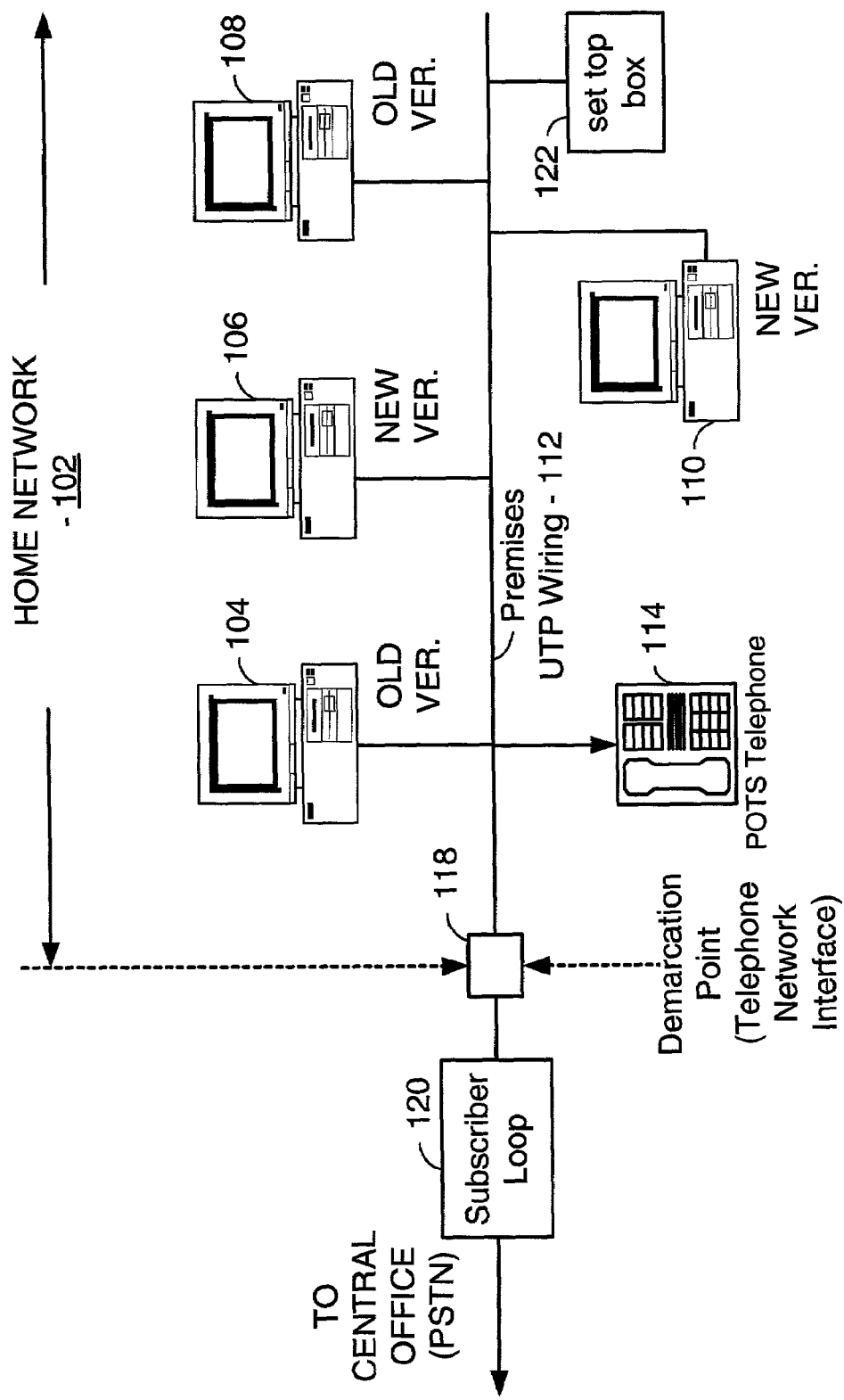
FIG. 1 is a system diagram illustrating a home data network that embodies the principles of the present invention.

FIG. 1 is a system diagram illustrating a home data network 102 that embodies the principles of the present invention. Home networking devices illustrated in FIG. 1 each support a single version of a plurality of versions of the HomePNA Specification. At the time of filing of this application, the HomePNA 2.0 Specification (Interface Specification for HomePNA 2.0.4 10M8 Technology (Version 0.8) date Jul. 17, 2001) was the most recent version of the HomePNA Specification. Computers 104 and 108 support an old version of the HomePNA standard, e.g., HomePNA 2.0, while computers 106 and 110 support a new version of the HomePNA Specification that may incorporate the teachings of the present invention, such new version designation not yet made. Hereinafter, references to an "old version" of the HomePNA Specification, "old version devices," or "old version operations" are generally made to devices and related operations that do not include the teachings of the present invention. Further, references to a "new version" of the HomePNA Specification, "new version devices," or "new version operations" are generally made to devices and related operations that include the teachings of the present invention. No other inferences or relationships regarding these references are to be drawn. These references are made merely to distinguish between those devices and operations that embody the teachings of the present invention and those devices and operations that do not.

Each of the computers 104–110 includes a network card and/or motherboard integrated circuits that support a respective version of the HomePNA Specification. Additionally, each of the computers 104–110 may also execute software instructions required for support of the respective a HomePNA Specification version. Operations according to the HomePNA 2.0 Specification are generally known and will only be described herein as they relate to the present invention.

The computers 104–110 communicate with one another via Unshielded Twisted Pair (UTP) wiring 112 located within a home network location 102. The UTP wiring 112 is generally referred to as "in-home telephone wiring." The UTP wiring 112 is shared with a Plain Old Telephone System (POTS) telephone 114 and a set top box 122. The UTP wiring 112 couples to the Public Switched Telephone Network (PSTN) via a PSTN subscriber loop 120. A demarcation point 118 interfaces the UTP wiring 112 to the subscriber loop 120. Via the UTP wiring 112 and the subscriber loop 120, the POTS telephone 114 and set top box 122 communicate with other devices across the PSTN. This construction and related operations are generally known and are not described further herein except as they relate to the present invention.

Table 1 describes some operational properties of old version operations and new version operations that may be implemented by computers 104 through 110 of FIG. 1. In Table 1, the old version is referred to as Home PNA 2.0 and the new versions are referred to as Mask 2 and Mask 3. Most description herein will relate particularly to Mask 2.

TABLE 1

NEW VERSION AND OLD VERSION PROPERTIES

|  | HomePNA 2.0 (old version) | Mask 2 (new version) | Mask 3 (new version) |
| --- | --- | --- | --- |
| Frequency Band | 4–10 MHz | 4–21 MHz | 4–28 MHz |
| Carrier Frequency | 7 MHz | 12 MHz | 18 MHz |
| Preamble/Header/Trailer symbol rate | 2 MHz | 2 MHz | 2 MHz |
| Payload Symbol Rate | 2, 4 MHz | 2, 4, 8, 16 MHz | 2, 6, 12, 24 MHz |
| Constellation Sizes | 2–8 bits/symbol | 2–8 bits/symbol | 2–8 bits/symbol |

As is shown in Table 1, the old version employs a carrier frequency of 7 MHz and a frequency band of 4 MHz to 10 MHz. The Mask 2 new version employs a carrier frequency of 12 MHz and a frequency band of 4 MHz to 21 MHz. Finally, the Mask 3 new version employs a carrier frequency of 18 MHz and a frequency band of 4 MHz to 28 MHz. Thus, each of these versions has a different carrier frequency and frequency band. As is illustrated in Table 1, the maximum supported payload symbol rates of the versions varies. However, the constellation size (bits/symbol) remains consistent among the versions (2 to 8 bits/symbol). Further, the preamble/header/trailer symbol rate for each of the old and new versions is consistent (2 MHz). Commonality in frequency band, symbol rate, and constellation size between the old version operations and new version operations is employed with the present invention for inter-version compatibility operations.

Figure 2:
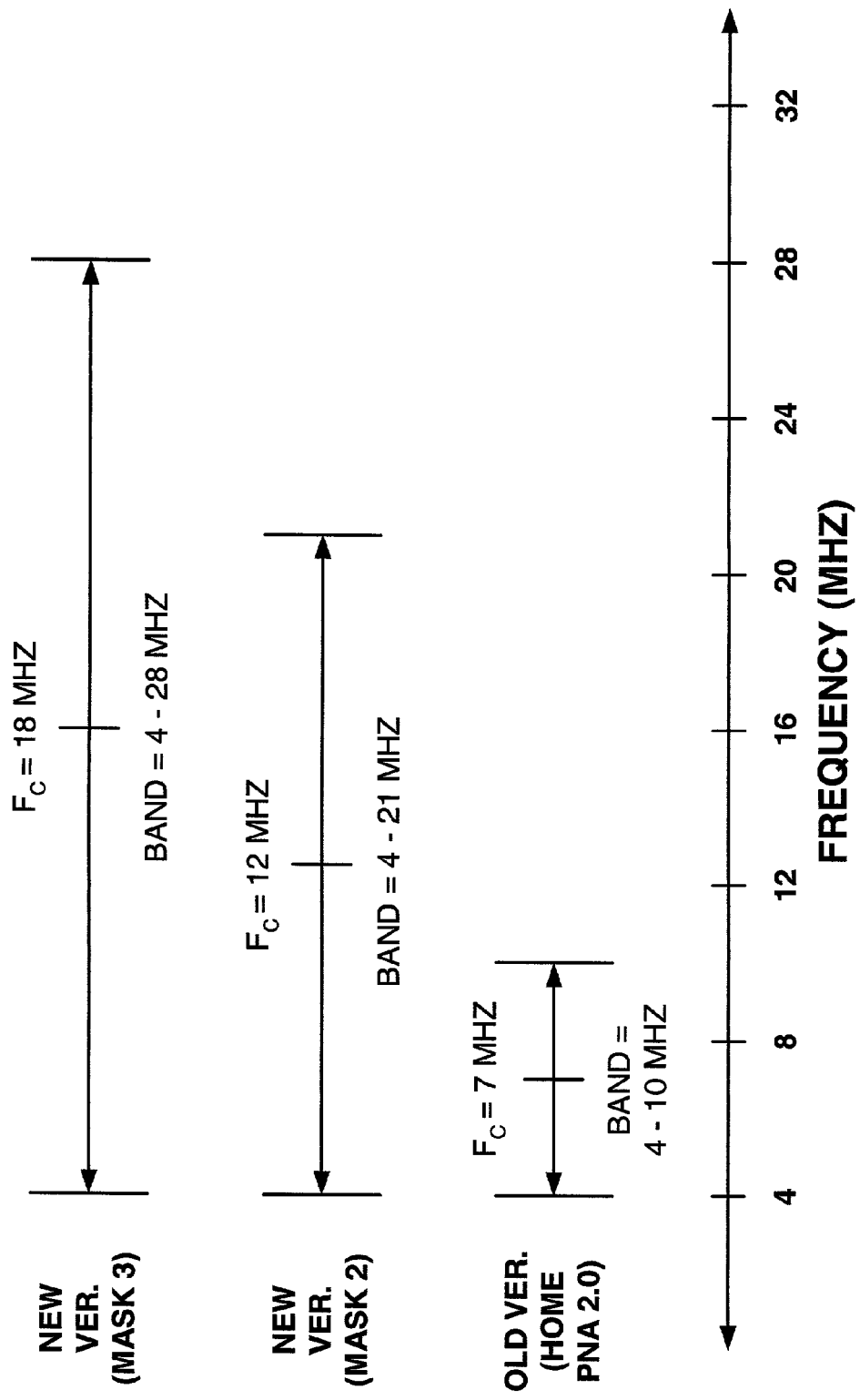
FIG. 2 is a graph illustrating the frequency bands and carrier frequencies defined for the old and new version operations of Table 1.

FIG. 2 is a graph illustrating the frequency bands and carrier frequencies defined for the old and new version operations of Table 1. With particular reference to old version operations, the HomePNA 2.0 Specification defines a signal format occupying the 4 MHz to 10 MHz frequency band, with a peak data rate of 32 Mbps. To modulate the signal, the HomePNA 2.0 Specification uses Quadrature Amplitude Modulation (QAM) and Frequency-Diverse Quadrature Amplitude Modulation (FDQAM). The modulation type is rate-adaptive with symbols rates of 2 MHz and 4 MHz, constellations sizes of 2 to 8 bits/symbol, and a carrier frequency of 7 MHz. The multiple stations share access to the medium using a type of Carrier-Sense Multiple Access (CSMA), where only one station may transmit at a time.

FDQAM is described in U.S. Regular application Ser. No. 09/971,407, filed Oct. 5, 2001 by Eric J. Ojard, in U.S. Regular application Ser. No. 09/169,522, filed Oct. 9, 1998 by Eric J. Ojard (both of which are incorporated herein in their entirety), and in Appendix C of the HomePNA 2.0.4 Specification. FDQAM is a modulation type wherein the spectral bandwidth of the signal is at least twice the symbol rate of a modulated signal such that multiple spectral copies of the modulated signal exist within the spectral bandwidth. As FDQAM is implemented in HomePNA 2.0.4, each spectral region of the modulated signal is represented by at least two spectral regions of the modulated signal, improving robustness in the presence of highly frequency-selective channels. In HomePNA 2.0, FDQAM applies to the 2 MHz symbol rate but not the 4 MHz symbol rate so that two spectral regions of the modulated signal are present. With the present invention, a technique similar to FDQAM is employed to form a backwards-compatible signal format.

Next-generation (new version) applications, such as streaming video, will require higher data rates, on the order of 100 Mbps and beyond. To achieve the highest possible data rates with the highest degree of reliability, the new version signal format, e.g., mask 2 and mask 3, will naturally occupy a larger bandwidth. To meet market requirements, new version HomePNA devices must coexist with HomePNA 2.0 stations on the same network. Thus, on a network with both HomePNA 2.0 stations and next-generation devices, either type of signal may be present on the network at different points in time. To simplify the development and to minimize the cost of the hardware for a next-generation station, it is highly desirable that the new version signal format be such that the same new version receiver hardware can process either new version signals or old version signals without prior knowledge of which type of signal is present. It is also desirable to use the same new version transmitter structure for either type of signal. Thus, according to the present invention, both HomePNA 2.0 receivers and new version HomePNA receivers may coexist on the same network.

Figure 3A:
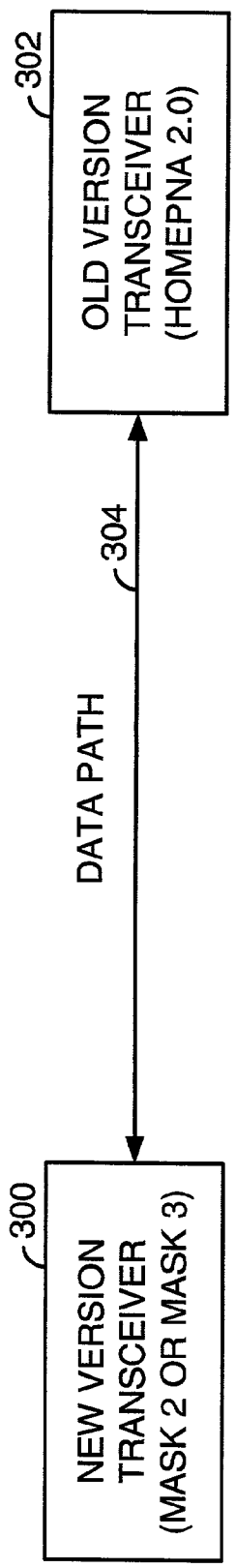
FIG. 3A is a block diagram illustrating generally how a new version device and an old version device interact according to the present invention.

FIG. 3A is a block diagram illustrating generally how a new version device and an old version device interact according to the present invention. As shown in FIG. 3A, an old version (HomePNA 2.0) transceiver 302 is able to communicate with a new version transceiver 300 (mask 2 or mask 3 of Table 1) via data path 304, e.g., the media 112 of FIG. 1. In particular, the new version device 300 transmits a new version signal that includes a component that appears, from the perspective of the old version device 302, to be an old version signal. The old version device 302 receives this component of the new version signal and, based upon information contained in a header portion of this component, determines whether it is the intended recipient for a respective payload of the corresponding data frame. If it is, the new version device 300 forms the payload so that the old version device 302 may receive it. In a transmission intended for a new version device, the new version device 300 forms the payload in a manner appropriate for receipt by another new version device. The old version device 302 simply ignores the payload.

Thus, in one operation, the old version device 302 receives the header, extracts data contained therein, determines that it is not the intended recipient, and ignores the corresponding payload (that is not compliant with the old version signal). In another operation, the new version device 300 sends a transmission intended for the old version device 302, indicating in the header that the transmission is intended for the old version device 302. In this operation, the old version device 302 receives the data contained in the payload. These operations will be described in detail with reference to FIGS. 4A–6C, 8, and 10A–12B.

For transmissions from the old version device 302 to the new version device 300, the old version device 302 transmits an old version signal. Using a same receiver structure that it uses for the receipt of both new version signals and old version signals, the new version device 300 receives the old version signal and extracts header information and payload contained in an old version signal data frame. With these receive operations, therefore, the old version signal also appears, from the perspective of the new version device to be a new version signal (at the corresponding symbol rate and constellation) transmitted over a channel that severely attenuates the higher frequencies. These operations will be described in detail with reference to FIGS. 7, 9, and 13A–14C.

Figure 3B:
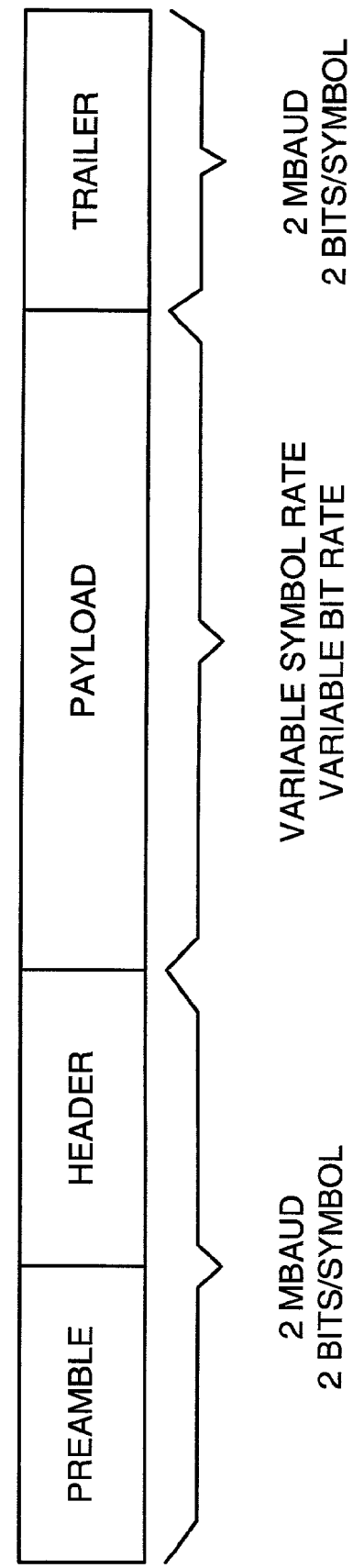
FIG. 3B is a block diagram illustrating the structure of a data frame constructed according to the present invention.

FIG. 3B is a block diagram illustrating the structure of a data frame constructed according to the present invention. As described in the HomePNA 2.0.4 specification, the data frame contains a preamble, a low-rate header, a variable high-rate payload, and a low-rate trailer, as shown in FIG. 3B. The preamble is a fixed sequence that provides for channel characterization, timing recovery, and equalizer training. The header indicates the modulation type of the payload, and it identifies the source and destination stations. The payload contains the data being transferred. The trailer provides a robust end-of-frame marker.

The duration of the data frames and the duration of each component of the data frames of the old version signal format and the new version signal format of FIG. 3B are consistent in some operations. From the perspective either of a new version device or of an old version device, the preamble, header, and trailer portions of the data frame of a new version signal and an old version signal are indistinguishable in the sense that they differ only in frequency-dependent magnitude and phase. In some operations, the payload of a new version signal and an old version signal are also indistinguishable from the perspective either of a new version device or of an old version device.

Both the new version signal data frame and the old version signal data frame will include, a preamble, a header, and a trailer having one or more spectral copies of a baseband modulated signal with a 2 MBaud symbol rate and a 2 bits/symbol constellation. As will be recalled from Table 1, the baud rate and constellation of the HomePNA 2.0 Specification and the new version signal(s) are consistent.

However, the payload of a new version signal will be incompatible with old version devices in some operations. As was indicated in Table 1, the payload symbol rates supported by the HomePNA 2.0 Specification were 2 and 4 MBaud with constellations of between 2 and 8 bits/symbol. For Mask 2, the payload is transmitted at a symbol rate of between 2 and 16 MBaud with a constellation of between 2 and 8 bits/symbol. Finally, for Mask 3, the payload is transmitted at symbol rate of between 2 MBaud and 24 MBaud with a constellation of between 2 and 8 bits/symbol. Thus, the baud rates and constellation sizes of the preambles, headers, and trailers are consistent between the old version and new versions (from the perspective of each spectral copy of the baseband modulated signal). However, the payloads of the old version signal and new version signals are fully compatible for some symbol rates and constellation sizes but are incompatible for other symbol rates and constellation sizes.

Referring again to FIG. 3A, a new version device 300 includes a transmitter structure that produces a backwards-compatible new version signal that may be received by an old version device 302. The new version device 300 also includes a receiver structure that receives both new version signals and old version signals. According to the present invention, the new version device 300 operates within a first frequency band, e.g., Mask 2 or Mask 3, while the old version device 302 operate within a second frequency band, e.g., HomePNA 2.0 Specification.

To address the inherent incompatibility between the new version device 300 and the old version device 302, a new version signal includes a spectral component that appears, from the perspective of an old version device, to be an old version signal. Using this spectral component of the new version signal, a new version device 300 transmits control information and data to the old version device. According to one structure of the new version signal, the new version signal includes a plurality of identical spectral copies of a baseband modulated signal that reside within the first frequency band. One (or multiple) of these spectral copies of the baseband modulated signal also resides within the second frequency band and is/are indistinguishable from the old version signal.

Likewise, the old version signal, when operated upon by a new version device 300, is indistinguishable from a new version signal (at corresponding symbol rates) with some spectral regions severely attenuated. Thus, the new version signal also supports the transmission of control information and data from old version devices to new version devices. According to one aspect of the present invention, the old version signal includes a spectral copy of a baseband modulated signal that resides within the second frequency band. This spectral copy of the baseband modulated signal also resides within the first frequency band and, when operated upon by the new version device, is indistinguishable from the new version signal. The old version signal may include multiple spectral copies of the baseband modulated signal within both the first and second frequency bands. In such case, the new version device optimally combines these spectral copies of the baseband modulated signal.

In one embodiment of the new version signal, all preamble, header, and trailer portions of a new version signal include a component (one of a plurality of spectral copies of a baseband modulated signal) that is indistinguishable from an old version signal. When a new version device 300 transmits data to another new version device, the payload portion of the new version signal may be incompatible with the old version device. Based upon the contents of the header, however, an old version device 302 determines that the payload is not for it intended and ignores the payload.

The new version signal of the present invention may include a frequency-shifted portion and a non frequency-shifted portion. In such case, the frequency-shifted portion includes a plurality of spectral copies of a frequency shifted baseband modulated signal that are transmitted within the first frequency band. One (or more) of these spectral copies of the baseband modulated signal is indistinguishable from an old version signal. Frequency shifting is performed so that at least one spectral copy of the baseband modulated signal is correctly formed within the second frequency band so that it is indistinguishable from an old version signal. In this embodiment, absent the frequency shifting operations, the new version signal would be incompatible with old version devices. With this embodiment, non-payload portions of the new version signal, i.e., preamble, header and trailer, are shifted in frequency for all operations. However, payload portions of the new version signal are frequency shifted only when intended for old version devices (or when transmitting at a symbol rate consistent with old version devices).

With one particular embodiment described with reference to FIGS. 5A and 6A–6C, a one MHz frequency shift is required. With the baseband modulated signal having a baud rate of 2 MHz, inversion of every other symbol of the appropriate portions of the baseband modulated signal frequency shifts those portions of the baseband modulated signal by 1 MHz in frequency. After up sampling, modulation, and transmit filtering at the new version carrier frequency (12 MHz), a spectral copy of a baseband modulated signal carrying the preamble, header, and trailer portions of the data frame (of FIG. 3B) is created at the carrier frequency of the old version device 302. In a non-carrier based modulation scheme, the spectral copy of the baseband modulated signal is produced within the appropriate frequency band and at a desired center frequency. This spectral copy of the baseband modulated signal carrying the preamble, header, and trailer portions of the data frame at the carrier frequency of the old version device is indistinguishable from an old version signal.

Figure 4A:
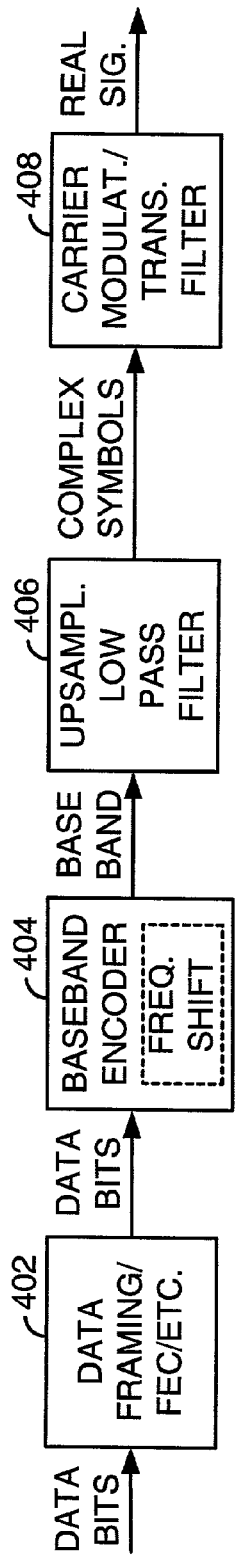
FIG. 4A is a block diagram generally illustrating the components of a carrier-based transmitter that operates according to the present invention.

FIG. 4A is a block diagram generally illustrating the components of a carrier-based transmitter that operates according to the present invention. In this structure, data bits are received by one or more operations 402 that perform data framing, coding, and other preprocessing operations. After these operations 402, data bits are output that are framed, encoded, and otherwise processed for transmission. These encoded and framed data bits are received by a baseband modulator 404, which encodes the data bits into a baseband modulated signal. The power spectral density of a baseband modulated signal carrying the preamble and header is illustrated in FIG. 5A. An up sampling low pass filter 406 up samples and low pass filters the baseband modulated signal. Resultantly, a signal is produced that includes a plurality of spectral copies of the baseband modulated signal. Each spectral copy of the baseband modulated signal resides within a respective frequency band and at a respective center frequency. A carrier modulation block/transmit filtering block 408 receives the plurality of spectral copies of the baseband modulated signal and modulates them onto a carrier to create a real signal that is coupled to a media, e.g., UTP wiring 112 of FIG. 1.

The baseband modulated signal produced by the baseband modulator 404 may also be frequency shifted by the baseband modulator 404. The baseband modulated signal is frequency shifted in some operations so that a spectral copy of the baseband modulated signal will exist within a desired frequency band and with an appropriate center frequency so that it corresponds to an old version device. During formation of the payload, frequency shifting may or may not occur, based upon the characteristics of an intended device, i.e., a new version device or an old version device.

Figure 4B:
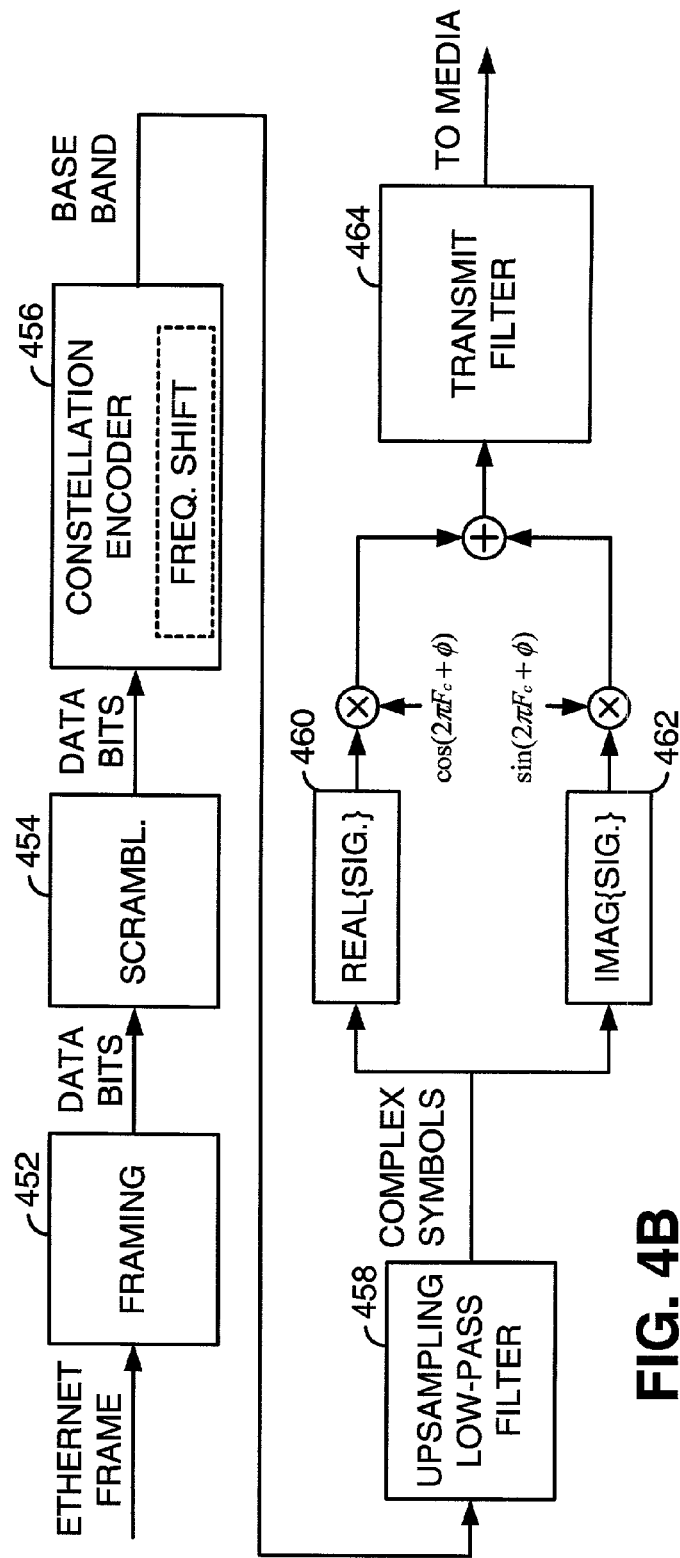
FIG. 4B is a block diagram illustrating in more detail the components of a carrier-based transmitter operating according to the present invention with particular applicability to a home networking installation.

FIG. 4B is a block diagram illustrating in more detail the components of a carrier-based transmitter operating according to the present invention with particular applicability to a home networking installation. Data bits in an Ethernet frame are received by framing block 452. Framing block 452 performs framing operations on the Ethernet frame and then provides its output to a scrambling block 454. The scrambling block 454 scrambles the frame that is received from framing block 452 and passes the scrambled frame as data bits to constellation encoder 456. The constellation encoder 456 creates the baseband modulated signal and frequency shifts the baseband modulated signal in some operations.

In one particular operation according to the present invention, the constellation encoder 456 frequency shifts portions of the baseband modulated signal corresponding to the preamble, header, and trailer of the data frame to create a frequency shifted baseband modulated signal. In one embodiment of these frequency-shifting operations, the constellation encoder 456 inverts every other symbol of the portions of the baseband modulated signal corresponding to the preamble, the header and the trailer. With a baseband modulated signal formed at 2 MBaud, by inverting every other symbol of these portions of the baseband modulated signal, the modified baseband modulated signal is shifted 1 MHz in frequency. The baseband modulated signal is received by up sampling low-pass filter 458 that up samples the baseband modulated signal and low pass filters the resultant signal. The resultant signal that includes a plurality of spectral copies of the baseband modulated signal.

FIG. 4B and all subsequent FIGs. are described with particular reference to the Mask 2 example of Table 1. The reader will appreciate that the Mask 3 example of Table 1 could easily be applied by considering the differing characteristics of Mask 3 operations. The output of the up sampling low-pass filter 458 includes both real and imaginary components, e.g., I and Q components. These components are passed to a real part processing block 460 and an imaginary part processing block 462. The outputs of blocks 460 and 462 are modulated with corresponding I and Q components of the 12 MHz carrier. The I and Q carrier modulated components are summed and then transmit filtered at transmit filter block 464 to produce a new version signal for transmission. The new version signal is then coupled to a serviced media, e.g., UTP wiring 112 of FIG. 1.

FIG. 5A is a graph illustrating the power spectral density of a baseband modulated signal carrying a preamble and header that is formed according to the present invention. The baseband modulated signal of FIG. 5A has a symbol rate of 2 MHz and a constellation that corresponds to the HomePNA 2.0 Specification. Thus, the power spectral density of the preamble and header portion of the baseband modulated signal has a 2 MHz bandwidth that corresponds to a 2 MBaud symbol rate. The power spectral density of the baseband modulated signal will vary from data frame to data frame based upon the contents of the header. However, the bandwidth of the baseband modulated preamble, header, and trailer portions of the baseband modulated signal will be 2 MHz for all 2 MBaud preambles/headers. A payload portion of the data frame will have similar characteristics when encoded at a symbol rate of 2 MBaud but will occupy a wider band when encoded at higher symbol rates. The description of FIGS. 5A through 6C will consider the power spectral density of the preamble and header portions of a corresponding data frame. However, this discussion applies to the trailer portion of the data frame as well and to the payload of the data frame when using a 2 MBaud symbol rate.

FIG. 5B is a graph illustrating the power spectral density of a plurality of spectral copies of the signal of FIG. 5A. The power spectral density 502 of FIG. 5B includes a plurality of spectral copies of the baseband modulated signal of FIG. 5A located adjacent one another and spread across the frequency spectrum. These spectral copies are aliases of the baseband modulated signal that are caused by the up sampling operations previously described. Each of these spectral copies of the baseband modulated signal has a bandwidth corresponding to the baseband modulated signal of FIG. 5A and has a respective center frequency.

Figure 5C:
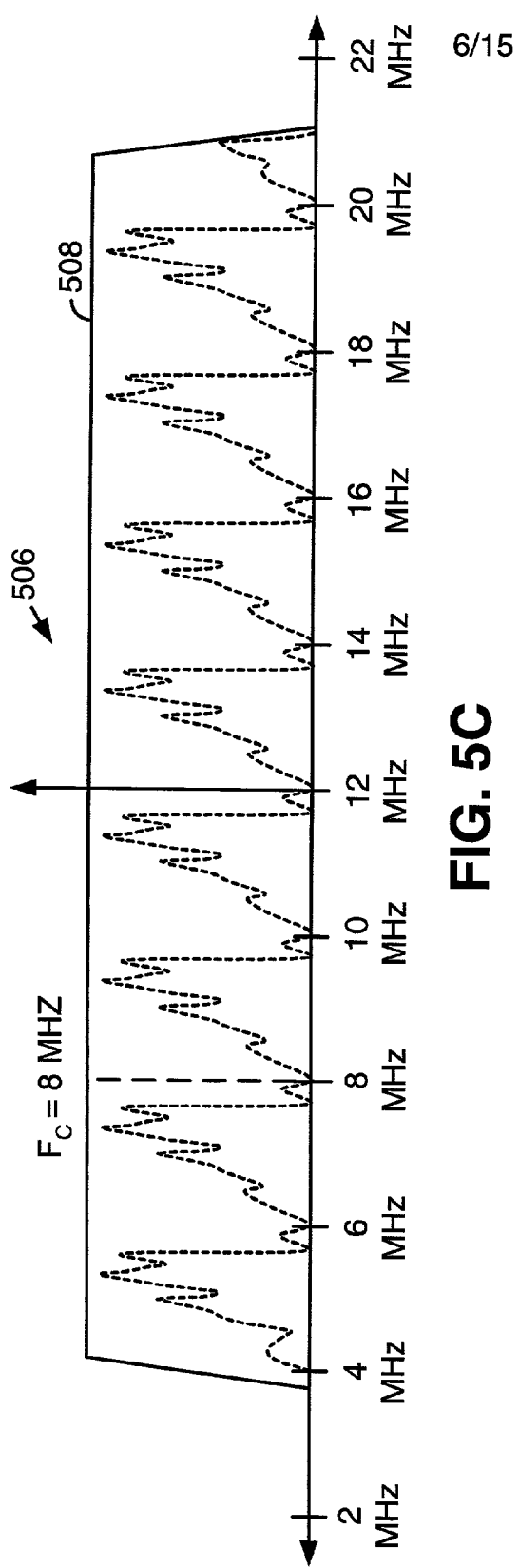
FIG. 5C is a graph illustrating the power spectral density of the signal of FIG. 5B after modulation with a 12 MHz new version device carrier and that is overlaid with a transmit filter corresponding to the new version device.

FIG. 5C is a graph illustrating the power spectral density 506 of the signal of FIG. 5B after modulation with a 12 MHz new version device carrier and that is overlaid with a transmit filter 508 corresponding to the new version device. The signal of FIG. 5B corresponds to the Mask 2 (new version signal) format with which the carrier frequency is 12 MHz and the frequency band is 4–21 MHz. The power spectral density 506 shown in FIG. 5C includes a plurality of spectral copies of the baseband modulated signal that have been modulated by the 12 MHz carrier and then transmit filtered. Thus, the power spectral density 506 appears similar to the power spectral density 502 of FIG. 5B but is centered about the carrier of 12 MHz and filtered with a transmit filter having at a frequency band of 4–21 MHz.

As is shown, the new version signal includes a plurality of spectral copies of the baseband modulated signal, each of these spectral copies of the baseband modulated signal having a 2 MBaud symbol rate. However, the signal of FIG. 5C has not been frequency shifting according to the present invention. The old version device of Table 1 operates within a frequency band of 4–10 MHz and has a carrier frequency of 7 MHz. While the signal of FIG. 5C includes a spectral copy of the baseband modulated signal at 6 MHz and 8 MHz within the frequency band of 4–10 MHz, it has no spectral copy at the 7 MHz carrier of the old version device of Table 1. Thus, this new version signal is incompatible with the old version device of Table 1.

Figure 6A:
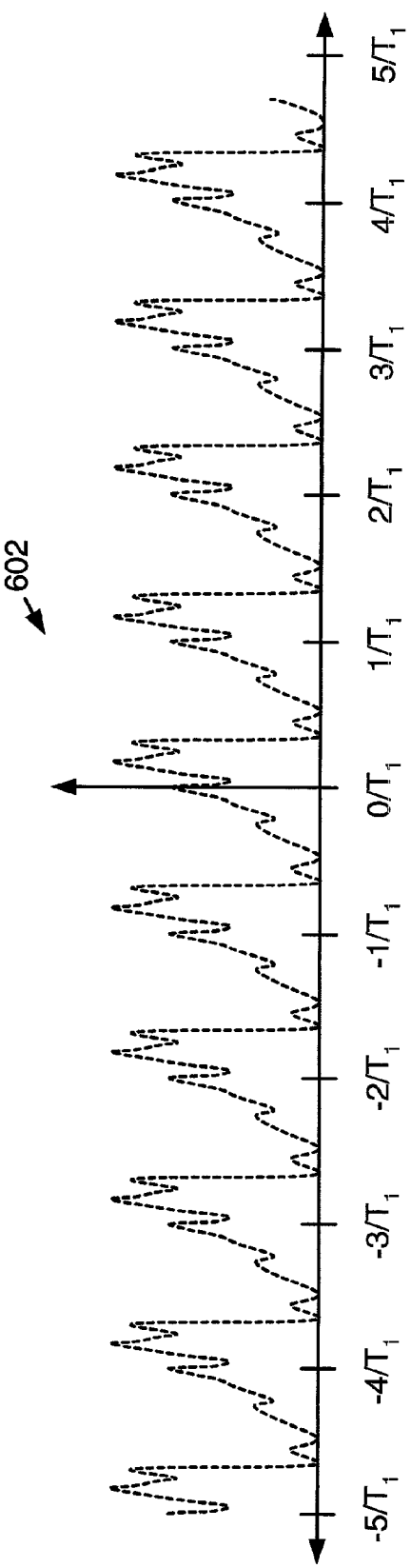
FIG. 6A is a graph illustrating the power spectral density of a plurality of spectral copies of a frequency shifted baseband modulated signal carrying a preamble and header that is formed according to the present invention.

FIG. 6A is a graph illustrating the power spectral density of a plurality of spectral copies of a frequency shifted baseband modulated signal carrying a preamble and header that is formed according to the present invention. In forming the signal of FIG. 6A, a baseband modulated signal was shifted in frequency by 1 MHz prior to up sampling low-pass filtering. As compared to the power spectral density 502 of FIG. 5B, the power spectral density 602 of FIG. 6A includes a plurality of spectral copies of the baseband modulated signal, each of which is shifted by 1 MHz in frequency from a corresponding spectral copy of the signal of FIG. 5B. As was previously described, one technique that may be applied to achieve this frequency shift is to invert every other symbol of the baseband modulated signal.

FIG. 6B is a graph illustrating the power spectral density 610 of the signal of FIG. 6A after modulation with a new version device carrier of 12 MHz and transmit filtering according to the present invention. The signal of FIG. 6B has a bandwidth corresponding to the new device transmit filter 612 band of 4–21 MHz. As contrasted to the signal of FIG. 5C, the signal of FIG. 6B includes a plurality of spectral copies of the baseband modulated signal that are shifted by 1 MHz in frequency even though the signal occupies the same 4–21 MHz frequency band.

FIG. 6C is a graph illustrating the power spectral density of the signal of FIG. 6B that is also overlaid with a 7 MHz carrier and 4–10 MHz frequency band of an old version device. The carrier frequency and the frequency band 620 of the HomePNA 2.0 Specification is illustrated along with the power spectral density 610 of FIG. 6B. As is shown, a spectral copy of the baseband modulated signal resides at the old version carrier frequency of 7 MHz (second carrier frequency) and resides within the old version frequency band of 4–10 MHz (second frequency band). This spectral copy of the baseband modulated signal is indistinguishable from an old version signal. Thus, the new version device producing the new version signal of FIG. 6B/6C is fully compatible with old version devices.

The preamble, header, and trailer portions of the new version signal may be formed so that they are at all times compatible with old version devices. Further, the payload of the new version signal is formed to be compatible with old version devices when transmitting data to an old version device. In such case, the power spectral density of the payload of a corresponding data frame will appear similar to the power spectral density 610 of FIGS. 6B and 6C. In other operations, a new version device could use this same signal construct to transfer a payload to another new version device. During most operations, however, when transmitting a payload to another new version device, a wider bandwidth signal format would be employed to achieve a higher data rate.

Figure 7:
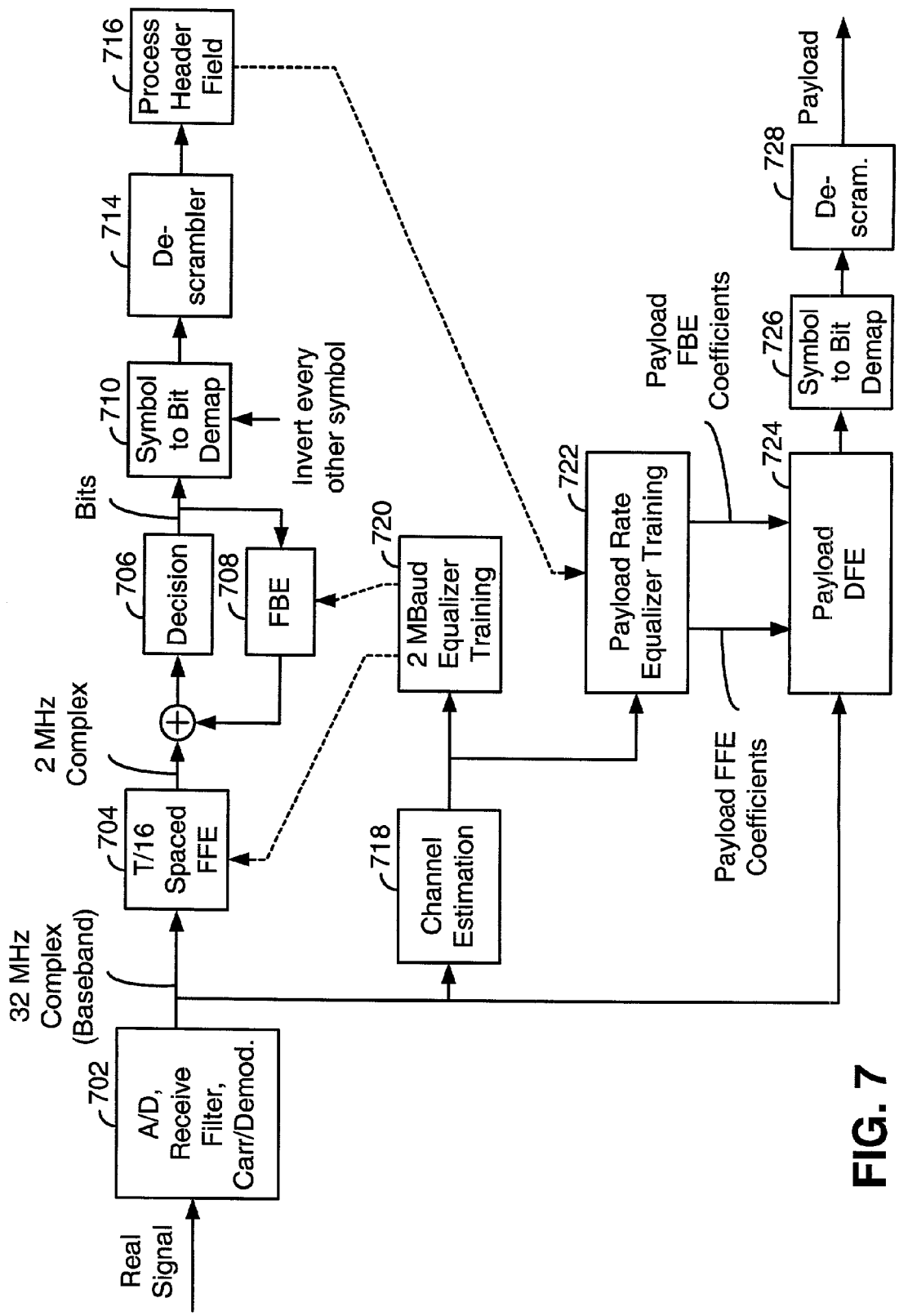
FIG. 7 is a block diagram illustrating components of a new version receiver section constructed according to the present invention.

FIG. 7 is a block diagram illustrating components of a new version receiver section constructed according to the present invention. The components of FIG. 7 may be contained in a home networking device such as the new version computers 106 and 110 of FIG. 1. The components of FIG. 7 may be implemented in dedicated hardware contained on an integrated circuit. Alternately, the components illustrated in FIG. 7 may be implemented within a digital signal processor contained in a device that supports home networking operations. Moreover, the components of FIG. 7 may be implemented as a combination of dedicated hardware components and a digital signal processor. Further, the components of FIG. 7 may be partially implemented in a host processor or other type of processor contained on a serviced device. Thus, the components of FIG. 7 are illustrated only to describe how the present invention may be functionally implemented in a new version device. As should be understood, these components may be employed in a home networking environment or in another networking environment in which interoperability between versions is performed.

In the receiver of FIG. 7, a real signal is received that is coupled to the device on a media such as the premises UTP wiring 112 of FIG. 1. This real signal may be amplified or attenuated prior to its receipt by an analog to digital converter, receiver filter, and carrier demodulation block 702. As is generally known, conversion from the analog domain to the digital domain is performed by an analog to digital converter (ADC) of block 702. Receive filtering and carrier demodulation from a carrier frequency, e.g., 12 MHz to baseband is also performed by block 702. In the particular embodiment of FIG. 7, ADC sampling is performed such that a 32 MHz complex baseband modulated signal is produced. This 32 MHz bandwidth is sufficient to sample the 4–21MHz band of the Mask 2 device of Table 1. Thus, for a 2 MBaud preamble, header, and header, the 32 MHz sampling rate corresponds to a T/16 fractional sampling ratio.

The receiver structure of FIG. 7 includes a first signal path for 2 MBaud symbol rates and another signal path for other symbol rates. Referring again to Table 1, the preamble, header, and trailer portions of both the new version signal and the old version signal have a 2 MBaud symbol rate. Thus, the 2 MBaud signal path processes the preamble, header, and trailer of each data frame. Further, the 2 MBaud signal path processes payloads that have a 2 MBaud symbol rate, e.g., old version signals received by a new version device.

For all operations, the output of the ADC, receive filter, and carrier demodulation block 702 is received by a channel estimation block 718. The channel estimation block 718 produces a channel estimate based upon a preamble contained in a data frame of the received signal. This channel estimate is used by a 2 MBaud equalizer training block 720 to produce coefficients for a feed forward equalizer (FFE) 704 and a feedback equalizer (FBE) 708 of the 2 MBaud signal path. Together, the FFE 704 and the FBE 708 make up a Decision Feed Back Equalizer (DFE) that services the 2 MBaud signal path. The channel estimate is also used by a payload rate equalizer-training block 722 to produce payload FFE coefficients and payload FBE coefficients for use by a payload DFE 724 (that include an FFE and a FBE).

With the FFE and FBE coefficients determined, the FFE 704 operates on the header of the data frame. The FFE 704 is a T/16 Spaced FFE that equalizes and optimally combines a plurality of spectral copies of a baseband modulated signal present within the bandwidth of the receive filter of block 702 (4–21 MHz). The output of the FFE 704 is received by summing block, which also receives the output of the FBE 708. The output of the summing block is received by decision block 706, which maps the baseband symbol to a corresponding constellation point. The output of decision block 706 is received by a symbol-to-bit demapper 710 that receives the constellation mapping output of decision block 706 and converts the constellation mapping to data bits. The output of the symbol-to-bit demapper 710 is received by descrambler 714, which performs descrambling operations. The output of the descrambler 714 is received by the process header field block 716 that determines at what baud rate and constellation size the payload portion of the corresponding data frame will be contained. This information is passed to the payload rate equalizer training block 722 and to a payload DFE 724.

Based upon the payload information extracted from the header, the payload rate equalizer training block 722 produces the payload FFE and the payload FBE coefficients that are employed by the payload DFE 724 to map symbols of the payload to constellation points. A payload symbol-to-bit demapper 726 receives the output of the payload DFE 724 and produces a scrambled bit stream. A payload descrambler 728 receives the output of the payload symbol-to-bit demapper 726 and produces the payload for the data frame.

According to the present invention, the symbol-to-bit demapper 710 inverts every other symbol of the received 2 MBaud baseband modulated signal to compensate for the 1 MHz frequency shift present in the signal. Further, for a payload transmitted by an old version device and received by the new version device of FIG. 7 (or for a frequency shifted payload at 2 MBaud transmitted by a new version device), such symbol inversion is also required.

Figures 8, 9:
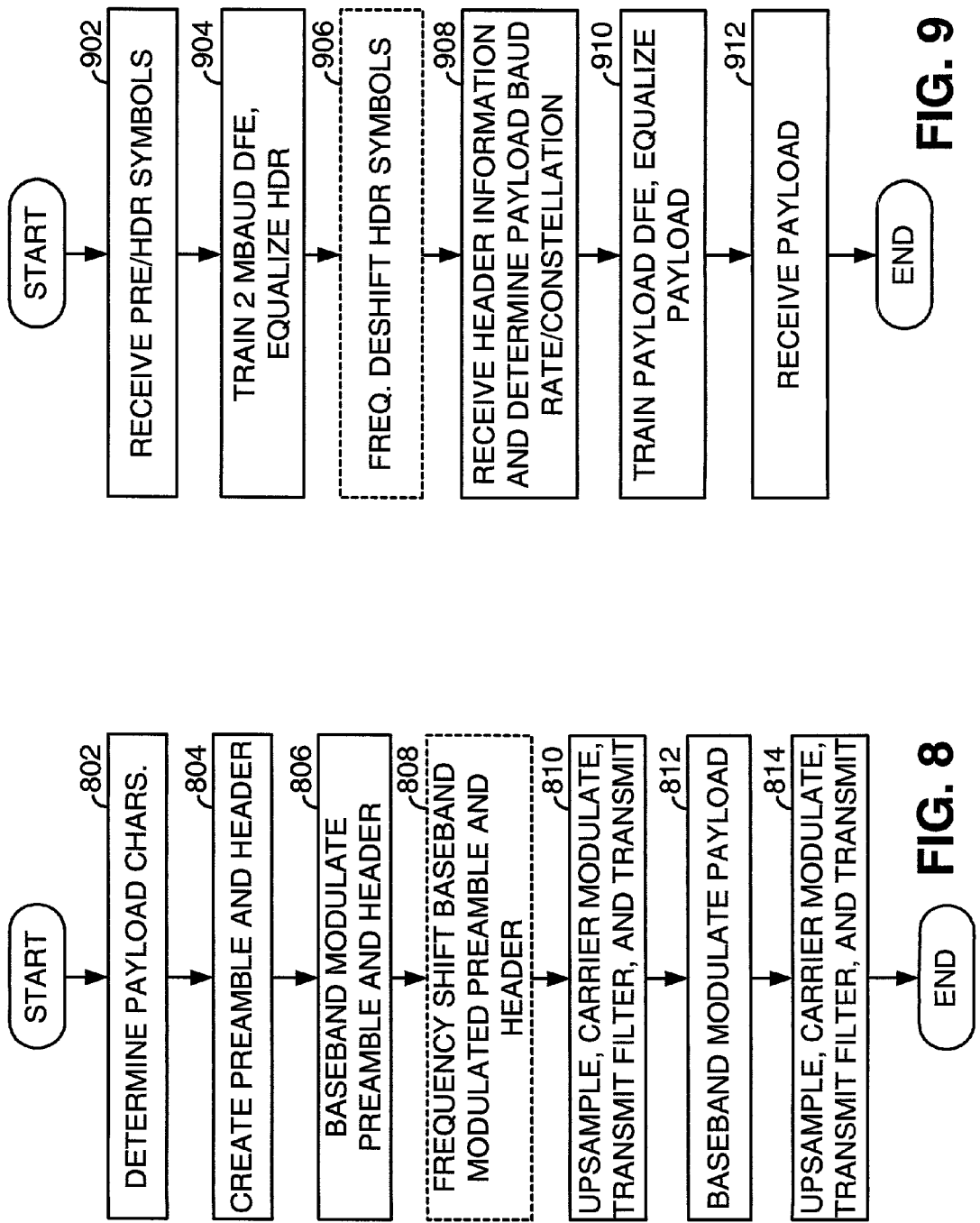
FIG. 8 is a logic diagram illustrating transmit operations according to the present invention.
FIG. 9 is a logic diagram illustrating receive operations according to the present invention.

FIG. 8 is a logic diagram illustrating transmit operations according to the present invention. In a transmit operation, the new version transmitter first determines a payload Baud rate and constellation size (step 802). As was described in detail with reference to FIG. 3B, the data frame format for a home networking environment includes a preamble, a header, a payload and a trailer. The header includes information to indicate respective payload Baud rate and constellation size. Thus, in creating the preamble and header at step 804, the header is created to include such information.

Once the preamble and header have been created for the particular data frame, the preamble and header are baseband modulated (step 806). Next, the baseband modulated preamble and header are frequency shifted (when required) according to the present invention (optional step 808). Then, the baseband modulated signal is up sampled, carrier modulated, transmit filtered, and transmitted on a physical media for receipt by another home networking device (step 810). In an alternate operation of step 810, a carrier-less modulation type, e.g., Carrier-less Amplitude and Phase (CAP) Modulation, is employed. Carrier-less operations will be described with reference to FIGS. 10A–12B. Next, the payload is baseband modulated (step 812), up sampled, carrier modulated, transmit filtered, and transmitted (step 814). Subsequent to these operations, the trailer is also baseband modulated, frequency shifted, up sampled, carrier modulated, transmit filtered, and transmitted on the media. The operations of FIG. 8 are then repeated for each subsequent data frame.

FIG. 9 is a logic diagram illustrating receive operations according to the present invention. The operations of FIG. 9 are performed by a new version receiver to operate upon a received physical layer data frame, either an old version signal or a new version signal. A receiver that operates according to FIG. 9 was illustrated in, and described with reference to FIG. 7. In a first operation, the receiver receives preamble and header symbols that have been ADC sampled, receive filtered, carrier demodulated, and optimally combined (step 902). A 2 MBaud equalizer training block then generates DFE coefficients for a 2 MBaud DFE and the 2 MBaud DFE equalizes the header (step 904). The header symbols are then operated upon by the DFE and mapped to a constellation. Then, when required to remove the frequency shifting modifications that have been made according to the present invention, every other symbol of the header is inverted (optional step 906).

Data is then extracted from the header that indicates the payload Baud rate and the constellation of the payload (step 908). Based upon the header information and a channel estimate determined from the preamble of the data frame, a payload DFE is trained (step 910), the payload is equalized, and data is extracted from the payload (step 912). When the payload corresponds to the data rate of the preamble and header, 2 MBaud, the 2 MBaud DFE is employed to operate upon the payload. Such is the case, in one example, when the data frame is transmitted from an old version device to the new version device.

FIG. 10A is a block diagram generally illustrating the components of a carrier-less transmitter that operates according to the present invention. In this structure, data bits are received by one or more operations 1002 that perform data framing, coding, and other preprocessing operations. After these operations 1002, data bits are output that are framed, encoded, and otherwise processed for transmission. These encoded and framed data bits are received by a baseband modulator 1004, which encodes the data bits into a baseband modulated signal. The power spectral density of a preamble and header portion of this baseband modulated signal is illustrated in FIG. 5A. An up sampling transmit filter 1006 up samples the baseband modulated signal and transmit filters the up sampled signal to create a signal that includes a plurality of spectral copies of the baseband modulated signal. Each of these spectral copies of the baseband modulated signal resides within a respective frequency band. This signal is then transmitted on a coupled media. In one embodiment of the structure of FIG. 10A, the structure produces a CAP modulated signal.

The baseband modulated signal produced by the baseband modulator 1004 may also be frequency shifted by the baseband modulator 1004. As was previously described, portions of the baseband modulated signal corresponding to the preamble, header, and trailer are frequency shifted in one operation in order for a spectral copy of the baseband modulated signal to exist within an appropriate frequency band that corresponds to the old version device. During formation of the payload, frequency shifting may or may not occur, based upon the characteristics of an intended device, i.e., old version device or new version device.

FIG. 10B is a block diagram illustrating in more detail the components of a carrier-less transmitter operating according to the present invention with particular applicability to a home networking installation. Data bits in an Ethernet frame are received by framing block 1052. Framing block 1052 performs framing operations on the Ethernet frame and then provides its output to a scrambling block 1054. The scrambling block scrambles the frame that is received from block 1052 and passes its scrambled frame as data bits to constellation encoder 1056. The constellation 1056 encoder creates the baseband modulated signal and frequency shifts the baseband modulated signal in some operations.

In one particular operation according to the present invention, the constellation encoder 1056 frequency shifts portions of the baseband modulated signal corresponding to the preamble, header, and trailer of a data frame. In one embodiment of these frequency-shifting operations, the constellation encoder 1056 inverts every other symbol of the portions of the baseband modulated signal corresponding to the preamble, the header and the trailer. With a baseband modulated signal formed at 2 MBaud, by inverting every other symbol of these portions of the baseband modulated signal, the baseband modulated signal is shifted 1 MHz in frequency.

The baseband modulated signal is received by both a real signal component block 1058 and an imaginary signal component block 1060. The output of the real signal component block 1058 is up sampled and transmit filtered by the real component of the transmit filter 1062. Likewise, output of the imaginary signal component block 1060 is up sampled and transmit filtered by the imaginary component of the transmit filter 1064. The up sampled and transmit filtered real and imaginary components produced by blocks 1062 and 1064, respectively, are then combined and transmitted on a coupled media.

Figure 11A:
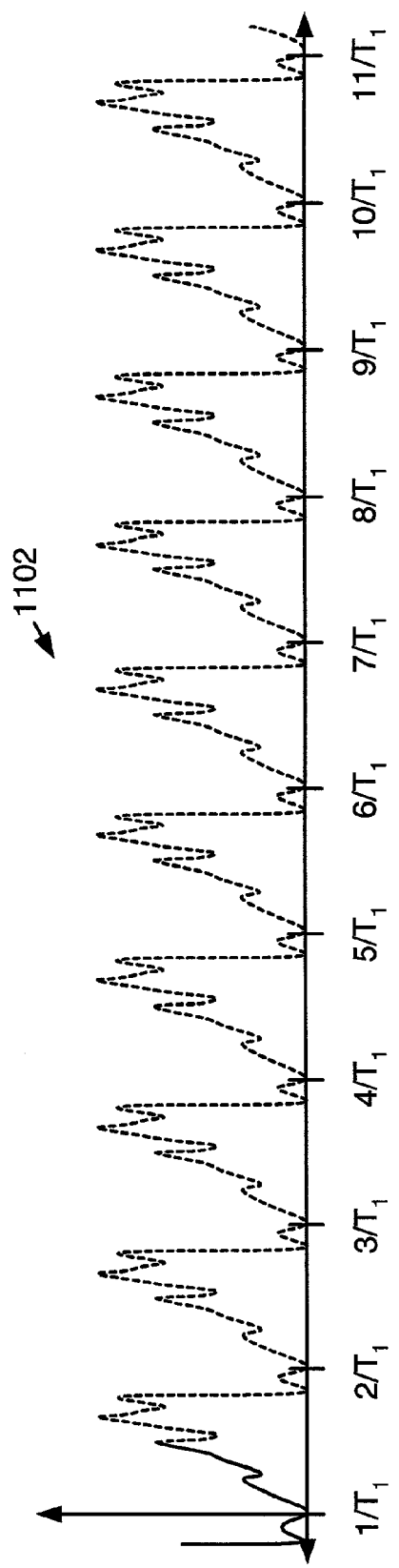
FIG. 11A is a graph illustrating the power spectral density of a plurality of spectral copies of a baseband modulated signal formed according to the present invention.

FIG. 11A is a graph illustrating the power spectral density of a plurality of spectral copies of a baseband modulated signal formed according to the present invention. Each spectral copy of the baseband modulated signal has a symbol rate of 2 MBaud, has the spectral characteristics of the baseband modulated signal of FIG. 5A, and resides within a respective frequency band. Each of these spectral copies of the baseband modulated signal has a 2 MHz bandwidth. The spectral copies of the baseband modulated signal are spaced at 2 MHz intervals.

Figure 11B:
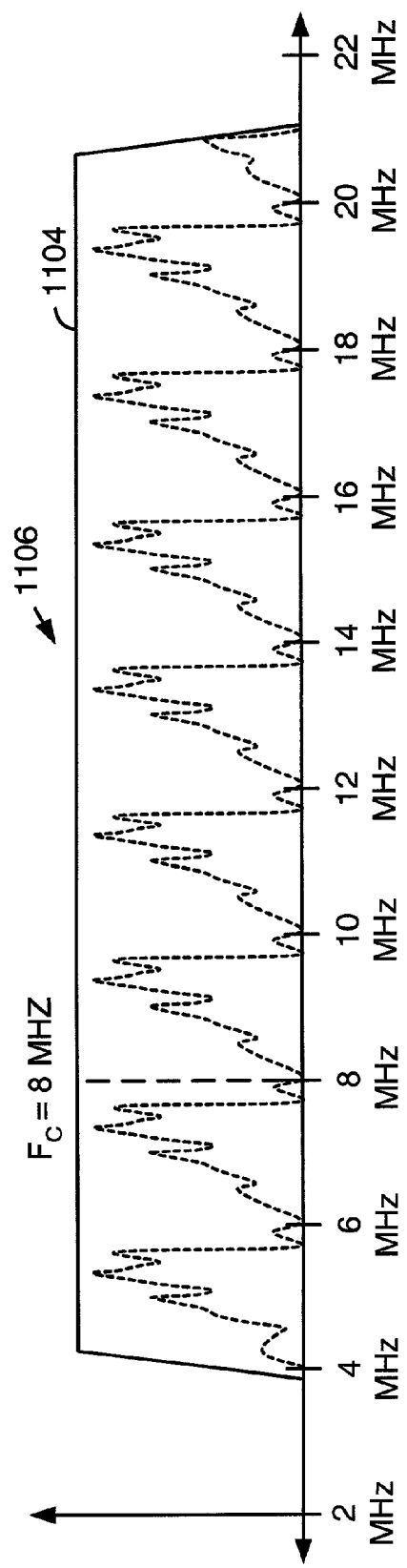
FIG. 11B is a graph illustrating the power spectral density of the signal of FIG. 11A after the signal has been transmit filtered.

FIG. 11B is a graph illustrating the power spectral density of the signal of FIG. 11A after the signal has been transmit filtered. The signal 1106 of FIG. 11B corresponds to the Mask 2 (new version signal) format where the transmit filter 1104 has a frequency band of 4–21 MHz. The signal 1106 of FIG. 11B includes a plurality of spectral copies of the baseband modulated signal, each of which has a 2 MBaud symbol rate. Each of these spectral copies of the baseband modulated signal carries the preamble and header of a corresponding data frame. The signal 1106 of FIG. 11B is indistinguishable from the signal 506 of FIG. 5C. As was the case with the signal 506 of FIG. 5C, the power spectral density of the signal of FIG. 11B does not include frequency shifting according to the present invention. As was also the case with the signal 506 of FIG. 5C, the signal 1106 includes a spectral copy of the baseband modulated signal centered at 8 MHz but does not include a spectral copy of the baseband modulated signal centered at 7 MHz. Thus, the new version signal 1106 of FIG. 11B is incompatible with the with old version device of Table 1.

Figure 12A:
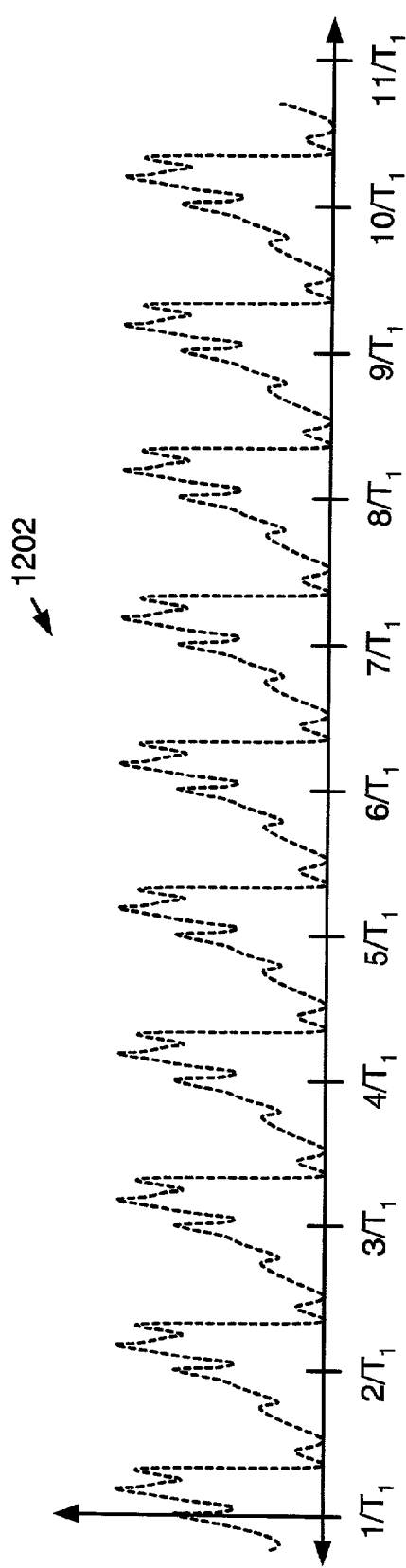
FIG. 12A is a graph illustrating the power spectral density of a plurality of spectral copies of a frequency shifted baseband modulated signal formed according to the present invention.

FIG. 12A is a graph illustrating the power spectral density of a plurality of spectral copies of a frequency shifted baseband modulated signal formed according to the present invention. With the signal 1202 of FIG. 12A, the baseband modulated signal was shifted in frequency by 1 MHz prior to up sampling. Thus, the signal 1202 of FIG. 12A is indistinguishable from the signal 610 of FIG. 6B. As compared to the signal 1102 of FIG. 11A, the signal 1202 of FIG. 12A has the same signal shape but with a 1 MHz frequency shift. As was previously described, one technique for achieving this frequency shift is to invert every other symbol of the baseband modulated signal corresponding to the preamble and header portions of the data frame.

Figure 12B:
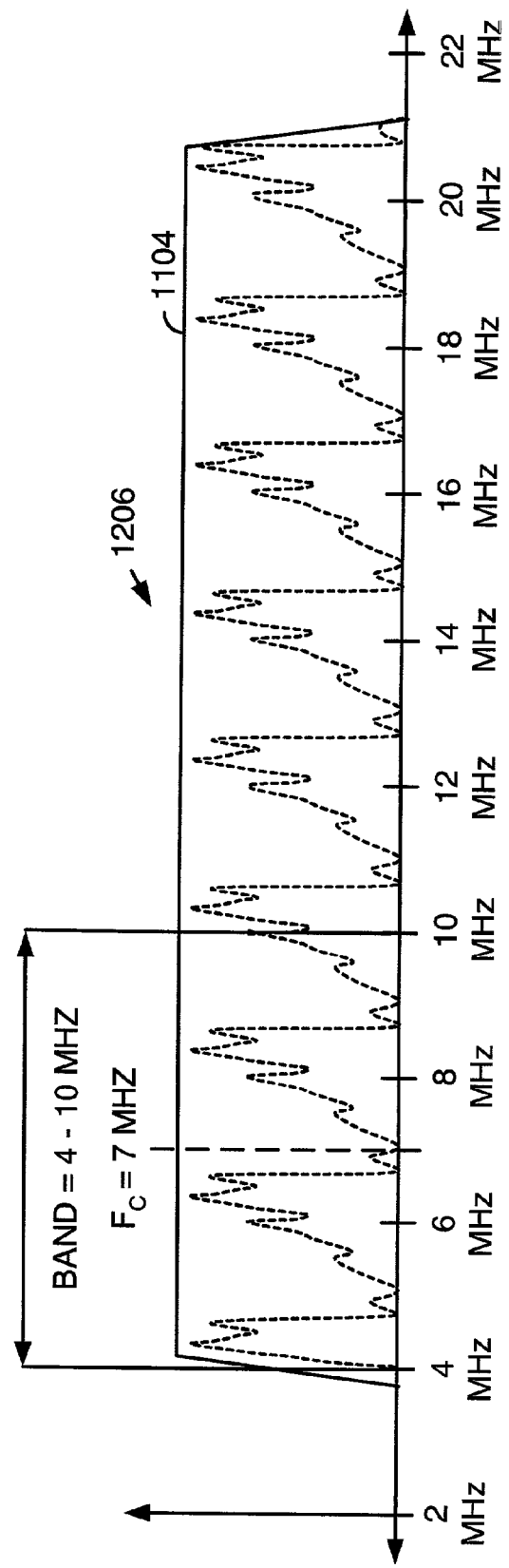
FIG. 12B is a graph illustrating the power spectral density of the signal of FIG. 12A after transmit filtering and that is overlaid with a 7 MHz carrier and 4–10 MHz frequency band of an old version device.

FIG. 12B is a graph illustrating the power spectral density of the signal of FIG. 12A after transmit filtering and that is overlaid with a 7 MHz carrier and 4–10 MHz frequency band of an old version device. As is shown, a spectral copy of the baseband modulated signal corresponding to the preamble and header resides at the old version carrier frequency of 7 MHz (second carrier frequency) and resides within the old version frequency band of 4–10 MHz (second frequency band). This spectral copy of the baseband modulated signal is indistinguishable from an old version signal. Because this spectral copy of the baseband modulated signal carries the preamble and header portions of a data frame, the old version device receiving the new version signal may extract the information contained therein and operate accordingly.

Figure 13A:
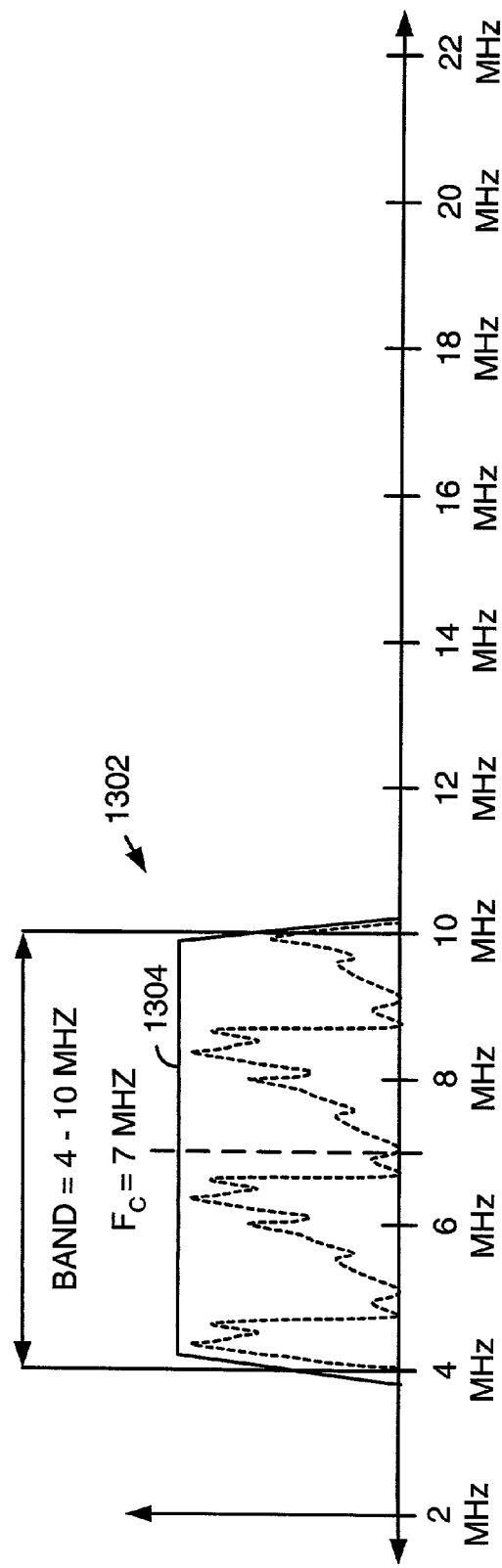
FIG. 13A is a graph illustrating the power spectral density of an old version signal that is modulated with a 7 MHz carrier and transmit filtered with an old version device transmit filter.

FIG. 13A is a graph illustrating the power spectral density of an old version signal that is modulated with a 7 MHz carrier and transmit filtered with an old version device transmit filter. The signal 1302 of FIG. 13A includes a complete spectral component of the baseband modulated signal centered at 7 MHz and partial spectral copies of the baseband modulated signal at 5 MHz and 9 MHz. These spectral components were produced by the old version device with a transmit filter that extends from 4 MHz to 10 MHz.

Figure 13B:
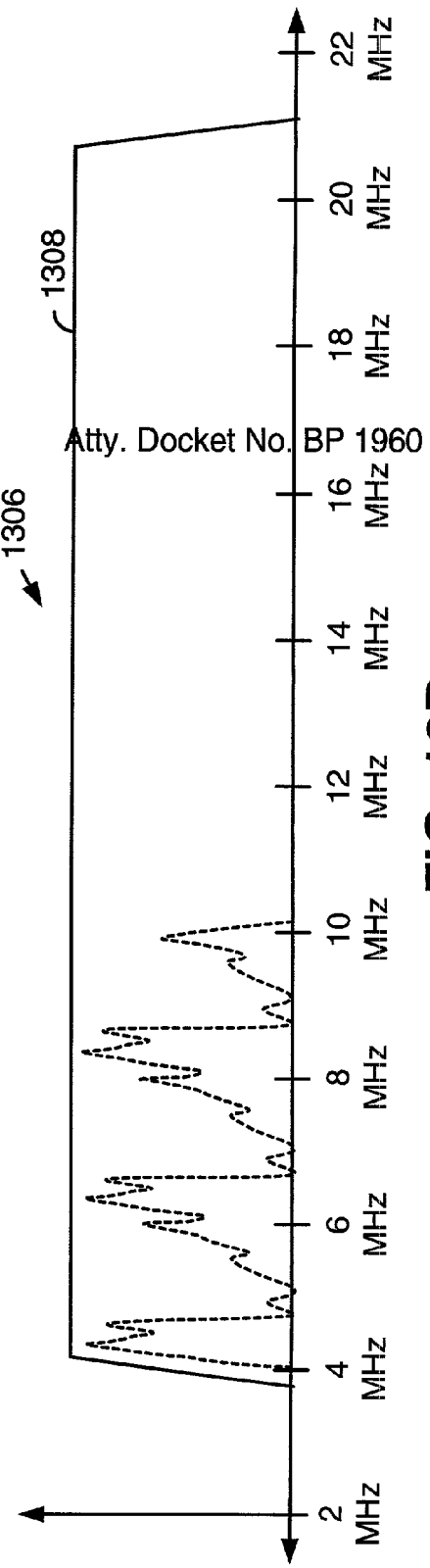
FIG. 13B is a graph illustrating the power spectral density of the old version signal of FIG. 13A overlaid with a receive filter of a new version device.

FIG. 13B is a graph illustrating the power spectral density of the old version signal of FIG. 13A overlaid with a receive filter of a new version device. As is shown, a receive filter 1308 of a new version device has a band extending from 4–21 MHz. Thus, with the receive filter 1308 of the new version device, a signal 1306 is produced corresponds directly to the signal 1302 produced by the old version device. From the point of view of the new version device, this signal looks like a new version signal transmitted over a channel that severely attenuates frequencies above 10 MHz. Since a new version receiver must be able to process such new version signals, it can process this old version signal in the same manner, without prior knowledge of the signal type.

A new version device will optimally combine the spectral components of the baseband modulated signal 1306 residing at 5 MHz, 7 MHz and 9 MHz. Such optimal combining is performed by the T/16 spaced FFE 704 of the receiver illustrated in FIG. 7. This optimal combining produces a signal having a 2 MBaud symbol rate and that includes each of the spectral copies of the signal 1302 of FIG. 13A. After receive filtering and optimal combining, the old version signal 1302 is indistinguishable from a new version signal.

FIG. 14A is a graph illustrating the power spectral density of a new version signal after transmit filtering. The signal 1402 of FIG. 14A has been up sampled and transmit filtered so that it includes a plurality of spectral copies of a baseband modulated signal and so that it resides within the frequency band of a corresponding transmit filter 1404. Each of these spectral copies of the baseband modulated signal has a 2 MBaud symbol rate and resides within a respective corresponding frequency band. The signal 1402 shown in FIG. 14A may have been produced by the structures of any of FIGS. 4A, 4B, 10A, or 10B. The signal of FIG. 14A has a frequency band of 4–21 MHz that corresponds to the Mask 2 new version device of Table 1.

FIG. 14B is a graph illustrating the power spectral density of the new version signal of FIG. 14A after channel attenuation and receive filtering by a new version device. The signal 1406 of FIG. 14B is representative of a signal that has been transmitted from one new version device, propagated across a media, such as the UTP 112 of FIG. 1, and that has been receive filtered 1408 by another new version device. These new version devices correspond to Mask 2 of Table 1. As is evident, the signal 1406 has been attenuated within some portions of the 4–21 MHz band. This frequency dependent attenuation is common in home network installations.

Thus, the new version signal 1406 of FIG. 14B includes a plurality of spectral copies of the baseband modulated signal, each of which has a symbol rate of 2 MBaud. Each of these spectral copies of the baseband modulated signal has been attenuated to some degree prior to its receipt. Upon receipt by a new version device, the new version device optimally combines the plurality of spectral copies of the baseband modulated signal to produce a signal having a symbol rate of 2 MBaud. This optimally combined signal carries the header of a corresponding data frame. After optimal combining, the signal is indistinguishable from an old version signal received by the same new version device.

Figure 14C:
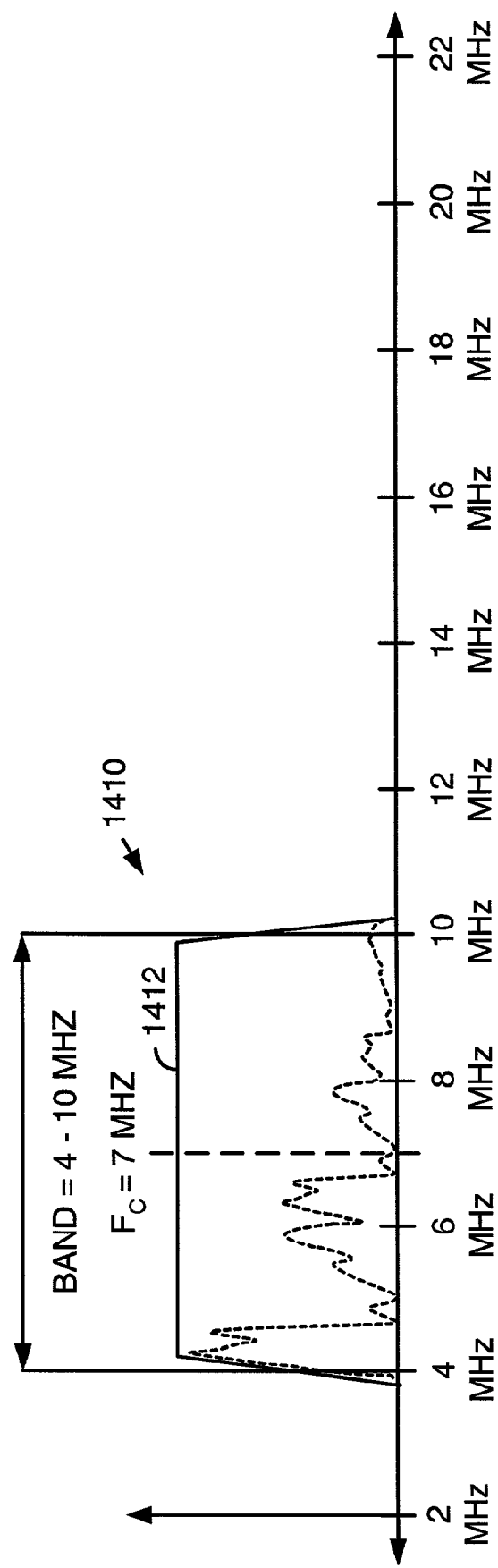
FIG. 14C is a graph illustrating the power spectral density of the new version signal of FIG. 14A after channel attenuation and receive filtering by an old version device.

FIG. 14C is a graph illustrating the power spectral density of the new version signal of FIG. 14A after channel attenuation and receive filtering by an old version device. The old version device that receives the new version signal receive filters the new version signal using a receive filter 1412 to produce a signal with a bandwidth corresponding to the receiver filter 1412. With the signal 1410 of FIG. 14C, the receive filter has a frequency band of 4–10 MHz. Thus, the signal 1410 of FIG. 14C also has a frequency band of 4–10 MHz. After receive filtering by the old version device, the signal is indistinguishable from an old version signal. For example, the signal 1302 of FIG. 13A has spectral components at the same relative positions within the frequency band of 4–10 MHz.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. A method for forming a backwards-compatible home networking signal by a new version device, the method comprising:
   forming a baseband modulated signal;
   up sampling the baseband modulated signal to create an up sampled signal having a plurality of spectral copies of the baseband modulated signal;
   transmit filtering the plurality of spectral copies of the baseband modulated signal with a transmit filter corresponding to a first frequency band of the new version device, wherein the first frequency band differs from a second frequency band of an old version device; and wherein the transmit filtered plurality of spectral copies of the baseband modulated signal includes a spectral copy of the baseband modulated signal that resides within the second frequency band.

2. The method of claim 1, further comprising shifting in frequency the baseband modulated signal prior to up sampling the baseband modulated signal.

3. The method of claim 2, wherein:
the baseband modulated signal includes a non-payload portion and a payload portion; and
only the non-payload portion of the baseband modulated signal is frequency shifted.

4. The method of claim 2, wherein:
the baseband modulated signal includes a non-payload portion and a payload portion;
when communicating with another new version device, only the non-payload portion of the baseband modulated signal is frequency shifted; and
when communicating with the old version device, both the non-payload portion and the payload portion of the baseband modulated signal are frequency shifted.

5. The method of claim 2, wherein shifting in frequency the baseband modulated signal comprises inverting every other symbol of the baseband modulated signal.

6. The method of claim 2, wherein an amount of frequency shift applied is based upon a carrier frequency of the old version device.

7. The method of claim 2, wherein an amount of frequency shift applied is upon:
a symbol rate of the baseband modulated signal; and
a carrier frequency of the old version device.

8. The method of claim 1, wherein:
the first frequency band is 4–21 MHz; and
the second frequency band is 4–10 MHz.

9. The method of claim 1, wherein:
the first frequency band is 4–28 MHz; and
the second frequency band is 4–10 MHz.

10. The method of claim 1, wherein:
the first frequency band overlaps with the second frequency band; and
the spectral copy of the baseband modulated signal that resides within the second frequency band resides within a portion of the first frequency band that overlaps with the second frequency band.

11. A method for forming a data networking signal for use within a data network shared by new version devices operating in a first frequency band and old version devices operating in a second frequency band, the method comprising:
forming a baseband modulated signal that carries a header and a payload;
frequency shifting portions of the baseband modulated signal that carry the header;
up sampling the baseband modulated signal to create an up sampled signal having a plurality of spectral copies of the baseband modulated signal;
transmit filtering the up sampled signal with a transmit filter corresponding to a first frequency band of the new version device, wherein the first frequency band differs from a second frequency band of an old version device; and
wherein the transmit filtered up sampled signal includes a spectral copy of the baseband modulated signal within the second frequency band.

12. The method of claim 11, wherein portions of the baseband signal that carry the payload are not frequency shifted.

13. The method of claim 11, wherein:
when communicating with another new version device, only portions of the baseband modulated signal that carry a preamble, the header, and a trailer are frequency shifted; and
when communicating with the old version device, all portions of the baseband modulated signal are frequency shifted.

14. The method of claim 11, wherein shifting in frequency the baseband modulated signal comprises inverting every other symbol of the baseband modulated signal.

15. The method of claim 11, wherein an amount of frequency shift applied is based upon a carrier frequency of the old version device.

16. The method of claim 11, wherein an amount of frequency shift applied is based upon:
a symbol rate of the baseband modulated signal; and
a carrier frequency of the old version device.

17. The method of claim 11, wherein:
the first frequency band is 4–21 MHz; and
the second frequency band is 4–10 MHz.

18. The method of claim 11, wherein:
the first frequency band is 4–28 MHz; and
the second frequency band is 4–10 MHz.

19. The method of claim 11, wherein:
the first frequency band overlaps with the second frequency band; and
the spectral copy of the baseband modulated signal that resides within the second frequency band resides within a portion of the first frequency band that overlaps with the second frequency band.

20. A data network transmitter of a new version device comprising:
a data framer that receives bits of data and that frames the bits of data to produce a data frame;
a baseband modulator coupled to the data framer that baseband modulates the data frame to form a baseband modulated signal that carries the data frame;
an up sampler coupled to the baseband modulator that up samples the baseband modulated signal to create an up sampled signal having a plurality of spectral copies of the baseband modulated signal;
a transmit filter coupled to the up sampler that transmit filters the up sampled signal, wherein the transmit filter has a frequency band corresponding to a first frequency band of the new version device, and wherein the first frequency band differs from a second frequency band of an old version device; and
wherein the transmit filtered up sampled signal includes a plurality of spectral copies of the baseband modulated signal, one of which resides within the second frequency band.

21. The data network transmitter of claim 20, further comprising a frequency shifter that frequency shifts the baseband modulated signal.

22. The data network transmitter of claim 21, wherein the frequency shifter frequency shifts portions of the baseband modulated signal corresponding to non-payload portions of the data frame.

23. The data network transmitter of claim 21, wherein:
the baseband modulated signal includes a non-payload portion and a payload portion;
when the data network transmitter communicates with a new version device, only the non-payload portion of the baseband modulated signal is frequency shifted; and when the data network transmitter communicates with an old version device, both the non-payload portion and the payload portion of the baseband modulated signal are frequency shifted.

24. The data network transmitter of claim 21, wherein the frequency shifter shifts the frequency of the baseband modulated signal by inverting symbols of the baseband modulated signal.

25. The data network transmitter of claim 21, wherein the frequency shifter shifts the frequency of the baseband modulated signal by inverting every other symbol of the baseband modulated signal.

26. The data network transmitter of claim 21, wherein an amount of frequency shift applied is based upon a carrier frequency of the old version device.

27. The data network transmitter of claim 21, wherein an amount of frequency shift applied is based upon:
a symbol rate of the baseband modulated signal; and
a carrier frequency of the old version device.

28. The data network transmitter of claim 20, wherein:
the first frequency band is 4–21 MHz; and
the second frequency band is 4–10 MHz.

29. The data network transmitter of claim 20, wherein:
the first frequency band is 4–28 MHz; and
the second frequency band is 4–10 MHz.

30. The data network transmitter of claim 20, wherein the transmit filter has a frequency band of 4–21 MHz.

31. The data network transmitter of claim 20, wherein the transmit filter has a frequency band of 4–28 MHz.

32. A method for forming a backwards-compatible home networking signal by a new version device, the method comprising:
forming a baseband modulated signal;
up sampling the baseband modulated signal to create a plurality of spectral copies of the baseband modulated signal;
transmit filtering the plurality of spectral copies of the baseband modulated signal with a transmit filter corresponding to a first frequency band of the new version device, wherein the first frequency band differs from a second frequency band of an old version device; and
wherein the transmit filtered plurality of spectral copies of the baseband modulated signal includes a spectral copy of the baseband modulated signal that resides within the second frequency band.

33. The method of claim 32, wherein:
the baseband modulated signal includes a non-payload portion and a payload portion; and
only the non-payload portion of the baseband modulated signal is up sampled to form the plurality of spectral copies of the baseband modulated signal.

34. The method of claim 33, wherein the non-payload portion comprises:
a preamble and a header that precede the payload portion; and
a trailer follows the payload portion.

35. The method of claim 32, wherein:
the baseband modulated signal includes a non-payload portion and a payload portion;
when communicating with another new version device, only the non-payload portion is up sampled to create the plurality of spectral copies of the baseband modulated signal; and
when communicating with the old version device, both the non-payload portion and the payload portion are spectrally copied.

36. The method of claim 32, wherein:
the first frequency band overlaps with the second frequency band; and
the spectral copy of the baseband modulated signal that resides within the second frequency band resides within a portion of the first frequency band that overlaps with the second frequency band.

37. The method of claim 36, wherein the transmit filter has a frequency band corresponding to the first frequency band of the new version device.

38. The method of claim 32, wherein the transmit filter has a frequency band of 4–21MHz.

39. The method of claim 32, wherein the transmit filter has a frequency band of 4–28MHz.

40. A method for forming a data networking signal for use within a data network shared by first device types operating in a first frequency band and second device types operating in a second frequency band, the method comprising:
forming a baseband modulated signal that carries a data frame having a header and a payload;
up sampling the baseband modulated signal to create a plurality of spectral copies of the baseband modulated signal;
transmit filtering the plurality of spectral copies of the baseband modulated signal with a transmit filter corresponding to the first frequency band, wherein the first frequency band differs from the second frequency band; and
wherein the transmit filtered plurality of spectral copies of the baseband modulated signal includes a spectral copy of the baseband modulated signal that resides within the second frequency band.

41. The method of claim 40, wherein:
the first frequency band overlaps with the second frequency band; and
the spectral copy of the baseband modulated signal that resides within the second frequency band resides within a portion of the first frequency band that overlaps with the second frequency band.

42. The method of claim 40, wherein a transmit filter used for transmit filtering has a frequency band that extends across both the first frequency band and the second frequency band.

* * * * *